(12) United States Patent
Nashif

(10) Patent No.: US 11,941,557 B2
(45) Date of Patent: *Mar. 26, 2024

(54) METHODS AND SYSTEMS FOR TASK EXECUTION IN A WORKPLACE

(71) Applicant: Intelligrated Headquarters, LLC, Mason, OH (US)

(72) Inventor: Hazem Nizar An Nashif, Oakland, CA (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,731

(22) Filed: Jan. 5, 2023

(65) Prior Publication Data

US 2023/0153710 A1 May 18, 2023

Related U.S. Application Data

(63) Continuation of application No. 16/690,672, filed on Nov. 21, 2019, now Pat. No. 11,580,465.

(51) Int. Cl.
*G06Q 10/0631* (2023.01)
*B65G 1/137* (2006.01)
(Continued)

(52) U.S. Cl.
CPC ..... *G06Q 10/06311* (2013.01); *B65G 1/1373* (2013.01); *G06Q 10/063114* (2013.01); *G06Q 50/28* (2013.01); *G06K 7/1413* (2013.01)

(58) Field of Classification Search
CPC ........... G06Q 10/087; G06Q 10/06311; G06Q 10/1097; G06Q 50/28
See application file for complete search history.

(56) References Cited

U.S. PATENT DOCUMENTS 6,775,588 B1 8/2004 Peck
7,084,738 B2 8/2006 Bastian, II
(Continued)

FOREIGN PATENT DOCUMENTS

CN 1926507 A 3/2007
CN 104335205 A 2/2015
(Continued)

OTHER PUBLICATIONS

Advisory Action (PTOL-303) dated Jul. 20, 2022 for U.S. Appl. No. 16/690,672.
(Continued)

*Primary Examiner* — Johnna R Loftis
(74) *Attorney, Agent, or Firm* — Alston & Bird LLP

(57) ABSTRACT

According to the embodiments illustrated herein, a method is disclosed. The method comprises receiving, by a computing device comprising a processor, an input from an operator device, wherein the input facilitates determining a task to be performed. Further, the method comprises activating, by the computing device, a first light device associated with a first location in a workplace in response to receiving the input, wherein the first location is associated with the task to be performed. Furthermore, the method comprises receiving, by the computing device, a first voice input from the operator device, indicative of an exception encountered during execution of the task. Additionally, the method includes modifying the task, in response to determining that the first voice input is indicative of the exception encountered during execution of the task.

18 Claims, 17 Drawing Sheets

(51) Int. Cl.
*G06Q 50/28* (2012.01)
*G06K 7/14* (2006.01)

(56) References Cited

U.S. PATENT DOCUMENTS

| | | |
|---|---|---|
| 8,755,931 B2 | 6/2014 | Issing |
| 11,001,445 B2 | 5/2021 | Hoffman |
| 2002/0087231 A1 | 7/2002 | Lewis et al. |
| 2004/0153207 A1 | 8/2004 | Peck |
| 2004/0207512 A1 | 10/2004 | Bastian |
| 2005/0222889 A1 | 10/2005 | Lai et al. |
| 2007/0080930 A1 | 4/2007 | Logan et al. |
| 2008/0121168 A1 | 5/2008 | Ryznar et al. |
| 2009/0012836 A1 | 1/2009 | Weissbach et al. |
| 2009/0129902 A1* | 5/2009 | Schafer ............... B65G 1/1378 414/274 |
| 2013/0253697 A1 | 9/2013 | Issing |
| 2013/0312371 A1* | 11/2013 | Ambrose ............... B65G 1/137 53/235 |
| 2014/0258882 A1 | 9/2014 | Latzina et al. |
| 2017/0015502 A1 | 1/2017 | Engel et al. |
| 2017/0083179 A1 | 3/2017 | Gruber et al. |
| 2017/0345247 A1 | 11/2017 | Torresani et al. |
| 2018/0286002 A1 | 10/2018 | Peck |
| 2018/0354719 A1 | 12/2018 | Hoffman |
| 2018/0376243 A1 | 12/2018 | Nagel et al. |
| 2019/0137968 A1 | 5/2019 | Ryznar et al. |
| 2020/0371629 A1 | 11/2020 | Hauenstein et al. |
| 2021/0245956 A1 | 8/2021 | Douglas et al. |

FOREIGN PATENT DOCUMENTS

| | | |
|---|---|---|
| CN | 109643217 A | 4/2019 |
| WO | 2019/100979 A1 | 5/2019 |

OTHER PUBLICATIONS

European Search Report dated Jan. 21, 2021 for EP Application No. 20207052, 8 page(s).
Final Office Action dated Mar 29, 2022 for U.S. Appl. No. 16/690,672.
Glynn, Fergal. What is a Pick to Light System? May 8, 2018 (Year: 2018).
Glynn, Fergal. What is Voice Picking? May 10 2018 (Year: 2018).
Non-Final Office Action dated Dec. 14, 2021 for U.S. Appl. No. 16/690,672.
Notice of Allowance and Fees Due (PTOL-85) dated Oct. 5, 2022 for U.S. Appl. No. 16/690,672.
CN Office Action dated Aug. 24, 2023 for CN Application No. 202011192601, 8 page(s).
English Translation of CN Office Action dated Aug. 24, 2023 for CN Application No. 202011192601, 7 page(s).
English translation of CN Search report dated Aug. 24, 2023 for CN Application No. 202011192601, 2 page(s).
U.S. Appl. No. 16/690,672, filed Nov. 21, 2019, U.S. Pat. No. 11,580,465, Issued.
CN Office Action dated Mar. 28, 2023 for CN Application No. 202011192601, 9 page(s).
English Translation of CN Office Action dated Mar. 28, 2023 for CN Application No. 202011192601, 12 page(s).
CN Office Action dated Nov. 16, 2023 for CN Application No. 202011192601, 3 page(s).
English Translation of CN Office Action dated Nov. 16, 2023 for CN Application No. 202011192601, 1 page(s).

* cited by examiner

METHODS AND SYSTEMS FOR TASK EXECUTION IN A WORKPLACE

CROSS-REFERENCE TO RELATED APPLICATIONS

This patent application is a continuation of U.S. patent application Ser. No. 16/690,672, filed Nov. 21, 2019, each of which is incorporated herein by reference in its entirety.

TECHNOLOGICAL FIELD

Exemplary embodiments of the present disclosure relate generally to a workplace and, more particularly, to methods and systems for executing a task in the workplace.

BACKGROUND

In workplaces such as, but not limited to, warehouse, manufacturing assembly line, and retail stores, workers may perform various tasks such as, but not limited to, picking tasks, placing tasks, inventory management tasks, and/or the like. Usually such tasks are executed at specific locations in the workplace. Accordingly, executing such tasks in the workplace may involve transmitting specific instructions (e.g., instructions containing information pertaining to the location where the task is to be performed) to the worker. Any discrepancy either in transmitting the instructions or misinterpretation of the instructions by the worker may lead to erroneous task execution, which may be undesirable

BRIEF SUMMARY

According to the embodiments illustrated herein, a method is disclosed. The method comprises receiving, by a computing device comprising a processor, an input from an operator device, wherein the input facilitates determining a task to be performed. Further, the method comprises activating, by the computing device, a first light device associated with a first location in a workplace in response to receiving the input, wherein the first location is associated with the task to be performed. Furthermore, the method comprises receiving, by the computing device, a first voice input from the operator device, indicative of an exception encountered during execution of the task. Additionally, the method includes modifying the task, in response to determining that the first voice input is indicative of the exception encountered during execution of the task.

According to the embodiments illustrated herein, a system is disclosed. The system comprises an operator device. The system further includes a first light device associated with a first location in a workplace, wherein a task is to be performed at the first location. The system additionally includes a computing device communicatively coupled to the operator device and the first light device, wherein the computing device comprises a processor configured to receive an input from the operator device, wherein the input facilitates determining the task to be performed. The computing device is further configured to activate the first light device in response to receiving the input, wherein the activated light device indicates the first location at which the task is to be performed. The computing device is further configured to receive a first voice input from the operator device, indicative of an exception, encountered during execution of the task, indicating a non-completion of the task. Additionally, the computing device is further configured to in response to determining that the first voice input is indicative of the exception, update the task, wherein updating the task includes at least determining a new task different from the task.

According to the embodiments illustrated herein, a computing device is disclosed. The computing device comprises a memory device configured to store a set of instructions. The computing device further comprises a processor communicatively coupled to the memory device, the processor is configured to execute the set of instructions to receive an input from an operator device, wherein the input facilitates determining a picking task associated with an item to be picked. The processor is further configured to activate a first light device associated with a first location in a workplace in response to receiving the input, wherein the first location is associated with the item to be picked. Additionally, the processor is configured to receive a first voice input from the operator device, indicative of an exception during execution of the picking task, wherein the exception during execution of picking task indicates non-completion of the picking task. Furthermore, the processor is configured to update the picking task, in response to determining that the first voice input is indicative of the exception during execution of the picking task, wherein updating the picking task includes at least determining a new picking task different from the picking task, or activating a second light device associated with a second location in the workplace to, wherein the second location is associated with the item to be picked to complete the picking task.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
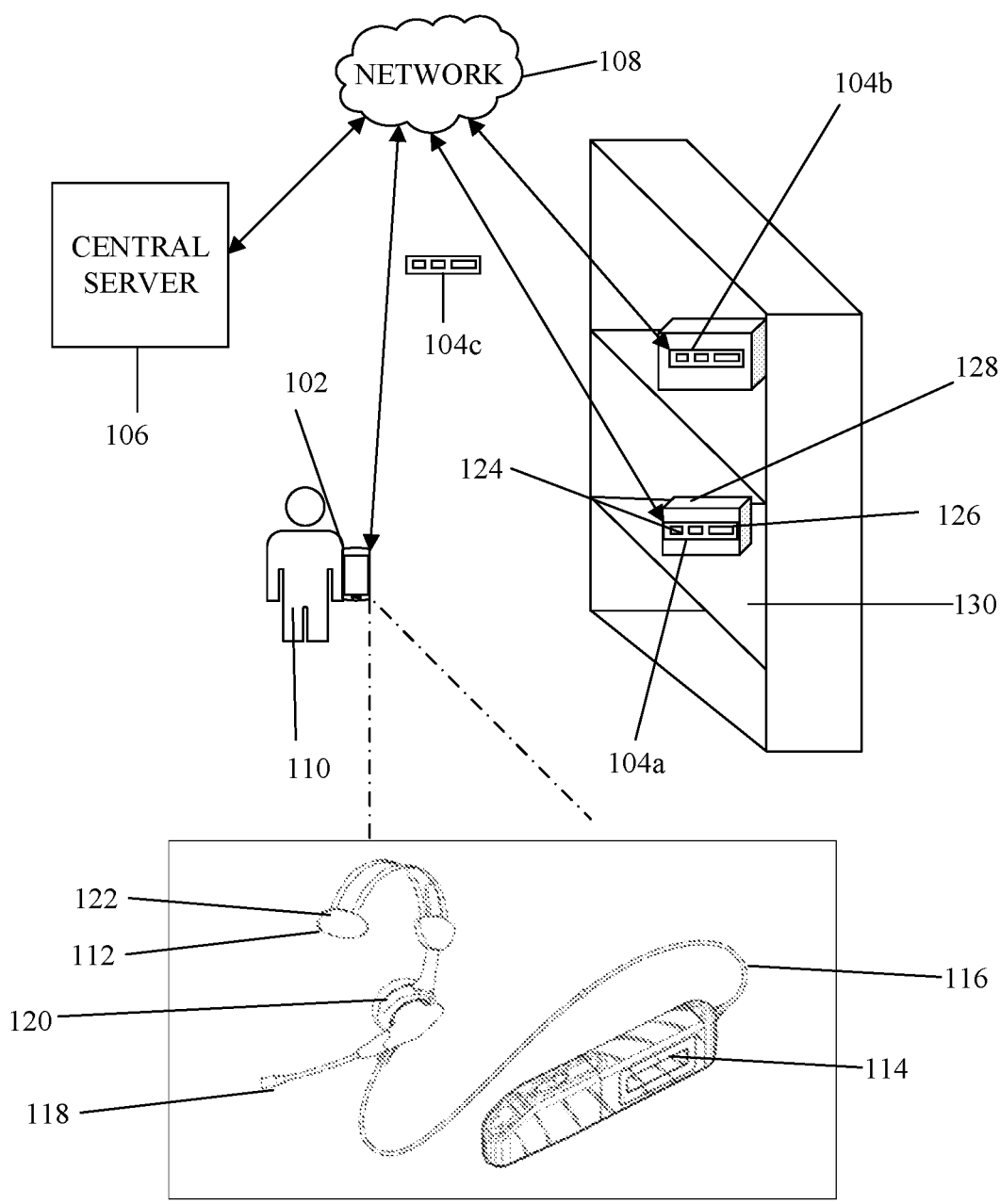
FIG. 1 illustrates an exemplary workplace, according to one or more embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations.

The term "comprising" means including but not limited to, and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," and the like generally mean that the particular feature, structure, or characteristic following the phrase may be included in at least one embodiment of the present disclosure, or may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "exception" may correspond to an anomaly encountered during execution of a task. Some examples of such anomaly encountered during the execution of the task may include, but are not limited to, a discrepancy between a first item present at the location and a second item to be picked from the location, a discrepancy between a first quantity of the item to be picked from the location and a second quantity of item present at the location, additional information about the task needed by the worker, and/or the like. In some examples, an exception report may be transmitted to a central server when the exception during the execution of the task is encountered. The exception report may correspond to a feedback report that is inputted by the worker on an operator device and, accordingly, the operator device transmits the feedback report to a central server. In some examples, the feedback report may include information pertaining to the anomaly encountered by the worker while executing a task in a workplace. For example, while executing a picking task, if the worker determines that not enough quantity of an item is present at the location, the worker may report such anomaly as the exception report.

The term "workflow" may correspond to a series of tasks that may or may not be performed in a predefined sequence. Some examples of workflows may include, but are not limited to picking workflows, placing workflow, validation workflow, and/or the like. For example, a picking workflow may include multiple picking tasks that may be performed in a predefined sequence to fulfill an order. In some examples, the scope of the disclosure is not limited to a workflow having similar tasks (for example, the picking workflow having the picking tasks). In an example embodiment, a workflow may have dissimilar tasks. For example, the validation workflow may include multiple picking tasks and placing tasks.

It is commonly understood that in a workplace, such as warehouses, retails stores, manufacturing assembly line, and/or the like, a worker may have to perform one or more tasks such as picking tasks, placing tasks, and/or the like. In some example, the worker may receive instructions, from a central server, pertaining to the one or more tasks on an operator device. In an example embodiment, the operator device may correspond to a device that the worker may interact with in order to perform the one or more tasks. In some examples, the operator device may be a voice-based device that may be configured to play audio commands to the worker based on the instructions received from the central server. For example, the operator device may play the instructions (as the audio commands) to the worker. In some examples, the instructions received from the central server may include information pertaining to a task, to be performed, such as, but are not limited to, a location in the workplace where the task is to be performed and a type of task to be performed (e.g., a picking task or a placing task), and a metadata associated with the task to be performed. In some scenarios, the worker listening to the audio command (that includes information pertaining to the task) may be unaware of the exact location where the task is to be performed. The audio command may not provide an accurate indication to the worker pertaining to the location where the task is to be performed. Further, in some scenarios, the worker may not be able remember the complete information pertaining to the task, as the information is received one time audio commands. Accordingly, the worker may end up at a wrong location in the workplace, which may further lead to erroneous execution of the task. Additionally, in some scenarios, the worker will spend time listening to the audio commands instead of performing said commands which may be less efficient in comparison with other environments.

In another implementation, the workplace may have one or more light devices installed at multiple locations in the workplace, where the one or more tasks may be performed. To this end, to direct the worker to the location (where the task is to be performed), the central server may activate a light device of the one or more light devices. In some examples, the worker may view the activated light device to determine the location where the task is to be performed. Additionally, the central server may cause the light device to display a first portion of a first metadata associated with the task to be performed. In an example embodiment, the first metadata associated with the task includes a type of task, a primary location in the workplace where the task is to be performed, a first quantity of first items to be picked or placed at the location, one or more secondary locations at which the task can be performed, consumer associated with the task, a first check digits associated with the task, and/or the like. For example, the central server may cause the light device to display the first quantity of a first item to be picked from the primary location. Accordingly, the worker may be able to identify the primary location in the workplace at which the task is to be performed. Further, based on the first portion of the first metadata, the worker may execute the task. In some scenarios, during execution of the task, the worker may encounter an anomaly. Some examples of the anomaly may include a discrepancy between a second item present at the location and the first item to be picked from the location, a discrepancy between a first quantity of the first item to be picked from the location and a second quantity of the first item present at the location, and/or the like. Reporting such anomaly may involve the worker going through a complex menu on the light device. After selecting the appropriate option, the light device may transmit an exception report.

Submitting the exception report through the light device may not efficient in comparison to submitting the exception report through the voice-based device, as submitting the exception report through the light device may involve the worker providing multiple inputs on the light device to navigate through the complex menu of the light device. On the other hand, submitting the exception report through the voice-based device may involve the worker providing inputs through voice commands. Accordingly, submitting the exception report through the light device may be less efficient in comparison to submitting the exception report through voice-based device.

The methods and systems described herein disclose an operator device, a light device, and a central server. In an example embodiment, the central server is communicatively coupled with the operator device and the light device. For example, the central server may be configured to transmit one or more instructions to the light device and the operator device such that the operator device and the light device may operate in accordance with the one or more instructions.

In an example embodiment, the operator device may correspond to a device that a worker in the workplace may utilize to perform a task. In some examples, the operator device may be a voice-based device that may be configured to receive voice inputs from the worker. Further, the operator device may be further configured to generate audio commands for the worker based on the one or more instructions received from the central server. The worker may listen to an audio command and may, accordingly, perform the task in the workplace. In some examples, the operator device may further include an image capturing device that may be capable of decoding machine-readable indicia, such as, a barcode and a QR code.

To initiate a task, the worker may provide a predefined input through the operator device. For example, the worker may scan a predefined barcode using the image capturing device, in the operator device, to initiate the task. In some examples, the predefined barcode may include information pertaining to a unique identification (ID) of the worker. Upon scanning the barcode, the operator device may decode the barcode to determine information encoded in the barcode (e.g., the unique ID of the worker). The operator device may thereafter transmit the information to the central server. In some examples, the scope of the disclosure is not limited to the worker utilizing the image capturing device to scan the predefined barcode to initiate the task. In some examples, the worker may provide a first voice input to the operator device to initiate the task. For example, the worker may say "initiate task" to initiate the task. In an alternate embodiment, the worker may speak the associated unique ID as the first voice input. Upon receiving the first voice input, the operator device may convert the voice input to text using known speech to text (STT) techniques. Thereafter, the operator device may be configured to transmit the text (representative of the voice input) to the central server as the information.

In an example embodiment, upon receiving the input (pertaining to initiating the task) from the operator device, the central server may determine the task, of the one or more tasks, associated with the worker. For example, the central server may determine the task associated with the worker based on the unique ID associated with the worker (that is received by the central server as the input from the operator device). Thereafter, the central server may be configured to activate a light device (of the one or more light devices installed at the one or more locations in the workplace) based on the first metadata associated with the determined task. In an example embodiment, the first metadata associated with the task includes a type of task, a primary location in the workplace where the task is to be performed, a first quantity of first items to be picked or placed at the primary location, one or more secondary locations at which the task can be performed, consumer associated with the task, a first check digits associated with the task, and/or the like.

In some examples, the light device may correspond to a light panel that may be installed at one or more locations in the workplace. In some examples, the one or more locations may correspond to places in the workplace where the one or more tasks may be performed in the workplace. For example, the light device may be installed at each of one or more shelves (that may correspond to the one or more locations) in the workplace, where each of the one or more shelves may be configured to store one or more items. In some examples, the scope of the disclosure is not limited to the light device installed at the one or more locations in the workplace. In an alternative embodiment, a single light device may be installed at a central location such as on the ceiling of the workplace. In such an embodiment, the light device may be configured to point to the one or more locations using pointing techniques such as, but not limited to, lasers.

As discussed, the central server may activate the light device based on the determined task. More particularly, the central server may activate light device installed at the primary location (of the one or more locations) of the task (determined from the first metadata associated with the task). Additionally, the central server may cause the light device to display a first portion of the first metadata associated with the task to be performed. In some examples, the first portion of the first metadata associated with the task may include, but not limited to, a first quantity of items to be picked or placed to/from the primary location.

In some examples, the worker may look at the activated light device to determine the primary location where the task is to be performed. Accordingly, the worker may traverse to the primary location to perform the task. In some examples, the worker may perform the task based on the first portion of the first metadata (associated with the task) displayed on the light device. After executing the task or during execution of the task, the worker may provide a second voice input to the operator device. In some examples, the second voice input may either indicate successful completion of the task or an exception encountered during the execution of the task. For example, the worker may provide the second voice input as "OK" to indicate successful completion of the task. Further, the worker may provide the second voice input "NOT OK" to indicate the exception during the execution of the task.

Alternately, after executing the task or during execution of the task, the worker may provide the second voice input indicating a second metadata associated with execution of the task. In some examples, the second metadata associated with the execution of the task may correspond to an operation that the worker may have performed in order to execute the task. For example, if the worker has picked 2 items from the location (indicated by the light device), the worker may provide the second voice input as "two", where two corresponds to the second metadata. In some examples, the operator device may convert the second voice input to a status text using STT techniques and transmit the status text to the central server. In an example embodiment, the central server may be configured to compare the status text with the first portion of the first metadata to determine whether the task was performed successfully. For example, if the central server determines that the status text (i.e., second quantity of items picked by the worker) is same as the first portion of the first metadata (i.e., first quantity of items to be picked from the location), the central server determines that the task is successfully performed. However, if the central server determines that the status text is not same as the first portion of the first metadata, the central server can determine that the exception was encountered during the execution of the task. Further, the central server may consider the second voice input to be the exception report pertaining to execution of the task.

In response to determining that the second voice input as the exception report, the central server may be configured to determine a new task that is to be performed by the worker. Alternately, the central server may be configured to activate a second light device at a second location at which the worker may successfully complete the task.

Accordingly, the methods and systems disclosed herein remove the hassles for the worker going through a complex menu on the light device to generate the exception report. Therefore, the productivity of generating the exception report through the second voice input is more efficient in comparison to generating the exception report through the light device (per the conventional techniques).

FIG. 1 illustrates an exemplary workplace 100, according to one or more embodiments described herein. The workplace 100 includes an operator device 102, one or more light devices 104 (e.g., light device 104a and light device 104b), a central server 106, and a network 108.

In an example embodiment, the operator device 102 includes suitable logic and/or circuitry that may enable the operator device 102 to receive inputs from a first worker 110 carrying the operator device 102. In some examples, the operator device 102 may correspond to a voice-based device that may be configured to receive voice inputs from the first worker 110. Further, the operator device 102 may be configured to generate audio commands that may correspond to instructions for the first worker 110 based on which the first worker 110 may perform a task. In some examples, the operator device 102 may include a headset assembly 112 that may be communicatively coupled to a portable computer terminal 114 by a communication cable 116 or by a wireless link (not shown), such as Bluetooth technology. In an example embodiment, the headset assembly 112 may include a speech microphone 118, such as a boom microphone. In some examples, the speech microphone 118 may be used for receiving the voice inputs from the first worker 110. Further, the headset assembly 112 includes a first earpiece speaker 120 that is located coaxially with a second earpiece speaker 122. The first earpiece speaker 120 and the second earpiece speaker 122 may be used to generate the audio commands that may correspond to instructions for the first worker 110. The structure and various components of the operator device 102 is further described in conjunction with FIG. 12.

The one or more light devices 104 may include a light source 124 such as, but not limited to, a Light-emitting diode (LED) or a LASER, and a display screen 126 (e.g., liquid crystal display (LCD), TFT, 7-Segment display, and/or the like). In some examples, the one or more light devices 104 may include suitable logic/circuitry that may enable the one or more light devices 104 to activate/deactivate the light source 124. Further, the one or more light devices 104 may include suitable logic/circuitry that may enable the one or more light devices 104 to display content on the respective display screen 126. In some examples, the one or more light devices 104 may receive a first instruction, from the central server 106, based on which the one or more light devices 104 may activate/deactivate the respective light source 124 and/or may display content on the display screen 126.

In some examples, the one or more light devices 104 may be installed at one or more locations in the workplace 100. For example, the one or more light devices 104 may be installed in each compartment 128 of a storage shelf 130. In some examples, the scope of the disclosure is not limited to the one or more light devices 104 installed at the one or more locations in the workplace 100. In an alternate embodiment, the workplace 100 may include a single light device such as (the light device 104c) may be installed at a central location such as a ceiling of the workplace 100 (such as the light device 104c). An orientation of such light device (i.e., the light device 104c) may be modifiable. For example, a pan and a tilt of the light device 104c may be modifiable based on the first instruction received from the central server 106. Further, the light device 104c may include LASER as the light source. The LASER light source may be utilized to point at the one or more locations in the workplace 100.

The central server 106 may include suitable logic/circuitry that may enable the central server 106 to control the operations of the operator device 102 and the one or more light devices 104. In some examples, the central server 106 may be configured to transmit one or more instructions to the operator device 102 and the one or more light devices 104. Further, the central server 106 may be configured to receive one or more voice inputs from the operator device 102, as is further described in conjunction with FIG. 3. In some examples, the central server 106 may further determine whether the one or more voice inputs indicate an exception during execution of a task, as is further described in conjunction with FIG. 3. In some examples, the structure of the central server 106 is further described in conjunction with FIG. 2.

The network 108 may be any means, such as a device or circuitry, embodied in either hardware or a combination of hardware and software that is configured to receive and/or transmit data from/to various devices of the workplace 100 (e.g., the one or more light devices 104 and the operator device 102). In this regard, the network 108 may include, for example, a network interface for enabling communications with a wired or wireless communication network. For example, the network 108 may include one or more network interface cards, antennae, buses, switches, routers, modems, and supporting hardware and/or software, or any other device suitable for enabling communications via a network. Additionally, or alternatively, the network 108 may include the circuitry for interacting with the antenna(s) to cause transmission of signals via the antenna(s) or to handle receipt of signals received via the antenna(s). Such signals may be transmitted using one or more communication protocols, such as Bluetooth® v1.0 through v5.1, Bluetooth Low Energy (BLE), infrared wireless (e.g., IrDA), ultra-wideband (UWB), induction wireless transmission, Wi-Fi, Near Field Communications (NFC), TCP/IP, UDP, 2G, 3G, 4G, 5G, Worldwide Interoperability for Microwave Access (WiMAX), or other proximity-based communications protocols.

Figure 2:
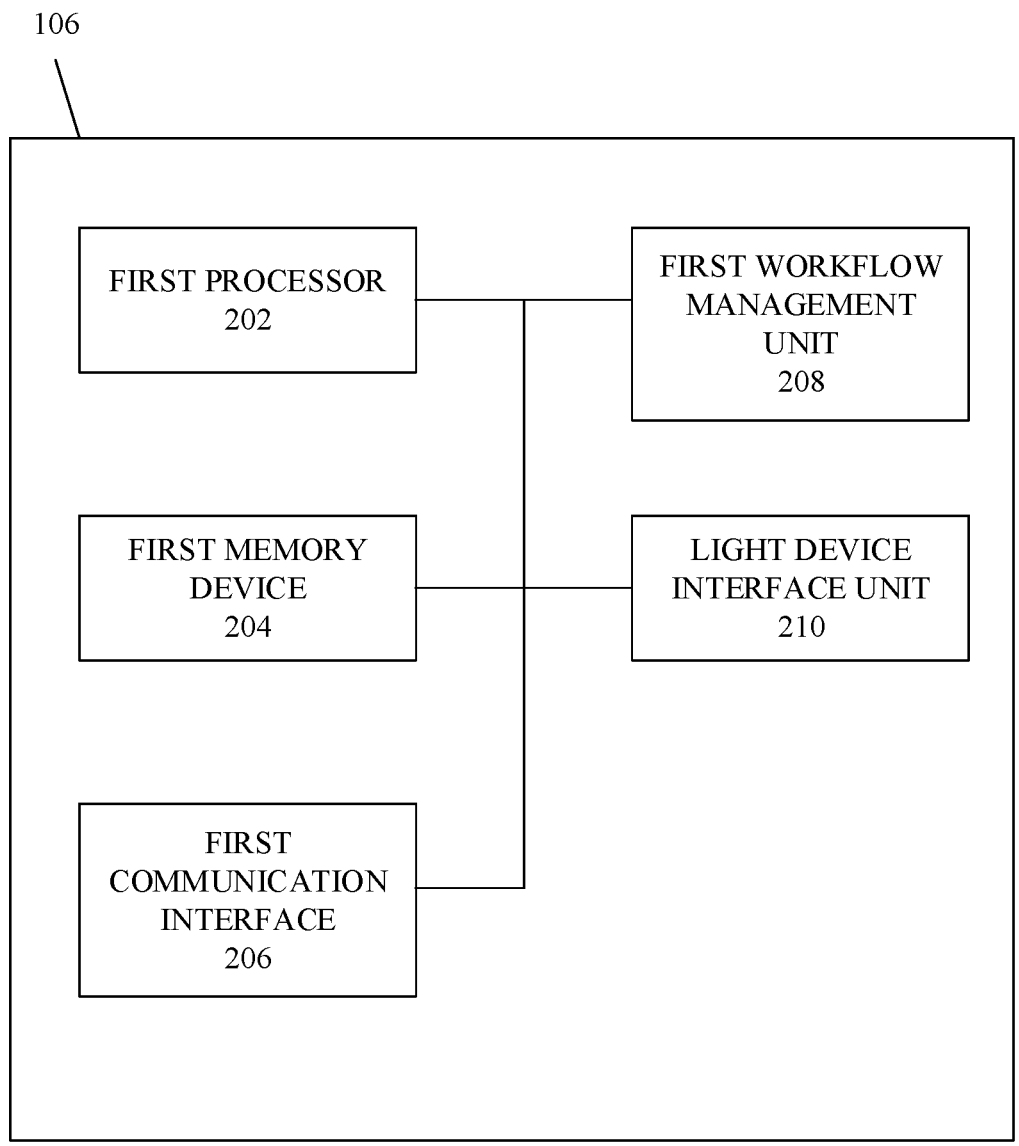
FIG. 2 illustrates a block diagram of a central server, according to one or more embodiments described herein.

FIG. 2 illustrates a block diagram of the central server 106, according to one or more embodiments described herein. In an example embodiment, the central server 106 may include a first processor 202, a first memory device 204, a first communication interface 206, a first workflow management unit 208, and a light device interface unit 210.

The first processor 202 may be embodied as means including one or more microprocessors with accompanying digital signal processor(s), one or more processor(s) without an accompanying digital signal processor, one or more coprocessors, one or more multi-core processors, one or more processors, processing circuitry, one or more computers, various other processing elements including integrated circuits such as, for example, an application specific integrated circuit (ASIC) or field programmable gate array (FPGA), or some combination thereof. Accordingly, although illustrated in FIG. 2 as a single processor, in an embodiment, the first processor 202 may include a plurality of processors and signal processing modules. The plurality of processors may be embodied on a single electronic device or may be distributed across a plurality of electronic devices collectively configured to function as the circuitry of the central server 106. The plurality of processors may be in operative communication with each other and may be collectively configured to perform one or more functionalities of the circuitry of the central server 106, as described herein. In an example embodiment, the first processor 202 may be configured to execute instructions stored in the first memory device 204 or otherwise accessible to the first processor 202. These instructions, when executed by the first processor 202, may cause the circuitry of the central server 106 to perform one or more of the functionalities, as described herein.

Whether configured by hardware, firmware/software methods, or by a combination thereof, the first processor 202 may include an entity capable of performing operations according to embodiments of the present disclosure while configured accordingly. Thus, for example, when the first processor 202 is embodied as an ASIC, FPGA or the like, the first processor 202 may include specifically configured hardware for conducting one or more operations described herein. Alternatively, as another example, when the first processor 202 is embodied as an executor of instructions, such as may be stored in the first memory device, the instructions may specifically configure the first processor 202 to perform one or more algorithms and operations described herein.

Thus, the first processor 202 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer-readable instructions to be downloaded over the Internet or another wired or wireless connection).

The first memory device 204 may include suitable logic, circuitry, and/or interfaces that are adapted to store a set of instructions that is executable by the first processor 202 to perform predetermined operations. Some of the commonly known memory implementations include, but are not limited to, a hard disk, random access memory, cache memory, read-only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read-only memory (CD-ROM), digital versatile disc read-only memory (DVD-ROM), an optical disc, circuitry configured to store information, or some combination thereof. In an embodiment, the first memory device 204 may be integrated with the first processor 202 on a single chip, without departing from the scope of the disclosure.

The first communication interface 206 may correspond to a communication interface that may facilitate transmission and reception of messages and data to and from various components of the workplace 100. For example, the first communication interface 206 is communicatively coupled with the one or more light devices 104 and the operator device 102 through the network 108. Examples of the first communication interface 206 may include, but are not limited to, an antenna, an Ethernet port, a USB port, a serial port, or any other port that can be adapted to receive and transmit data. The first communication interface 206 transmits and receives data and/or messages in accordance with the various communication protocols, such as Bluetooth® v1.0 through v5.1, Bluetooth Low Energy (BLE), infrared wireless (e.g., IrDA), ultra-wideband (UWB), induction wireless transmission, Wi-Fi, Near Field Communications (NFC), TCP/IP, UDP, 2G, 3G, 4G, 5G, Worldwide Interoperability for Microwave Access (WiMAX), or other proximity-based communications protocols.

The first workflow management unit 208 may include suitable logic-circuitry that may enable the first workflow management unit 208 to create, monitor, or track a workflow. In an example embodiment, the workflow may include one or more tasks that may be performed by the first worker 110 in a predefined sequence or randomly to complete a work job. For example, a picking workflow may include one or more picking tasks that the worker may have to perform at the one or more locations in the workplace 100. In some examples, the first workflow management unit 208 may provide an interface to a supervisor worker through which the supervisor worker that may provide input to the central server 106 to define one or more workflows, as is further described in FIG. 3. In some examples, the supervisor worker may provide the input through the interface the one or more workflows with one or more workers working in the workplace 100, as is further described in FIG. 3. In some examples, the supervisor worker may provide the input through the interface to associate the one or more workflows with unique IDs of the one or more workers. For example, the supervisor worker may associate a first workflow with a unique ID of the first worker 110. In an example embodiment, the first workflow management unit 208 may be configured to transmit one or more instructions to the one or more light devices 104 and the operator device 102 associated with the first worker 110 in accordance with the first workflow associated with the first worker 110, as is further described in FIG. 3. Further, the first workflow management unit 210 may be configured to monitor the execution of a task defined in the first workflow, as is further described in FIG. 3. For example, the first workflow management unit 208 may determine whether the task (defined in the workflow) is successfully completed, as is further described in FIG. 3. Further, the first workflow management unit 208 may determine whether the first worker 110 has encountered an exception during execution of the task (defined in the first workflow), as is further described in FIG. 3. In response to determining that the first worker 110 has encountered an exception, the first workflow management unit 208 may initiate the exception handling routine, as is further described in conjunction with FIG. 3. In some embodiments, the first workflow management unit 208 may include a separate processor, specially configured Field Programmable Gate Array (FPGA), or Application Specific Integrated Circuit (ASIC).

The light device interface unit 210 may include suitable logic/circuitry that may enable the light device interface unit 210 to communicate with the one or more light devices 104 installed at the one or more locations in the workplace 100. In an example embodiment, the light device interface unit 210 may be configured to communicate with the one or more light devices 104 through the first communication interface 206. In some examples, the light device interface unit 210 may be configured to transmit a first instruction to the light device 104a of the one or more light devices 104 that causes the light device 104a to activate the associated LED or the LASER, as is further described in FIG. 3. In an example embodiment, the light device interface unit 210 may be capable of addressing each of the one or more light devices 104, individually, based on the one or more locations where the one or more light devices 104 have been installed. In some examples, the light device interface unit 210 may refer to a first look-up table that includes a mapping between the one or more light devices 104 and the one or more locations where the one or more light devices 104 have been installed in the workplace 100. The first look-up table may be pre-stored in the first memory device 204. In some embodiments, the light device interface unit 210 may include a separate processor, specially configured Field Programmable Gate Array (FPGA), or Application Specific Integrated Circuit (ASIC).

The operation of the central server 106 is further described in conjunction with FIGS. 3-11.

FIGS. 3, 4, 5, 6, 7, 8, 9, 10, 11, 13, 14, 15, and 16 illustrate example flowcharts of the operations performed by an apparatus, such as the central server 106 of FIGS. 1 and 2, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations FIGS. 3, 4, 5, 6, 7, 8, 9, 10, 11, 13, 14, 15, and 16, when executed, convert a computer or processing circuitry into a particular machine configured to perform an example embodiment of the present invention. Accordingly, the operations of FIGS. 3, 4, 5, 6, 7, 8, 9, 10, 11, 13, 14, 15, and 16 define algorithms for configuring one or more computers or processors to perform various example embodiments. In some cases, a general purpose computer may be provided with an instance of the processor which performs the algorithms of FIGS. 3, 4, 5, 6, 7, 8, 9, 10, 11, 13, 14, 15, and 16 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

Figure 3:
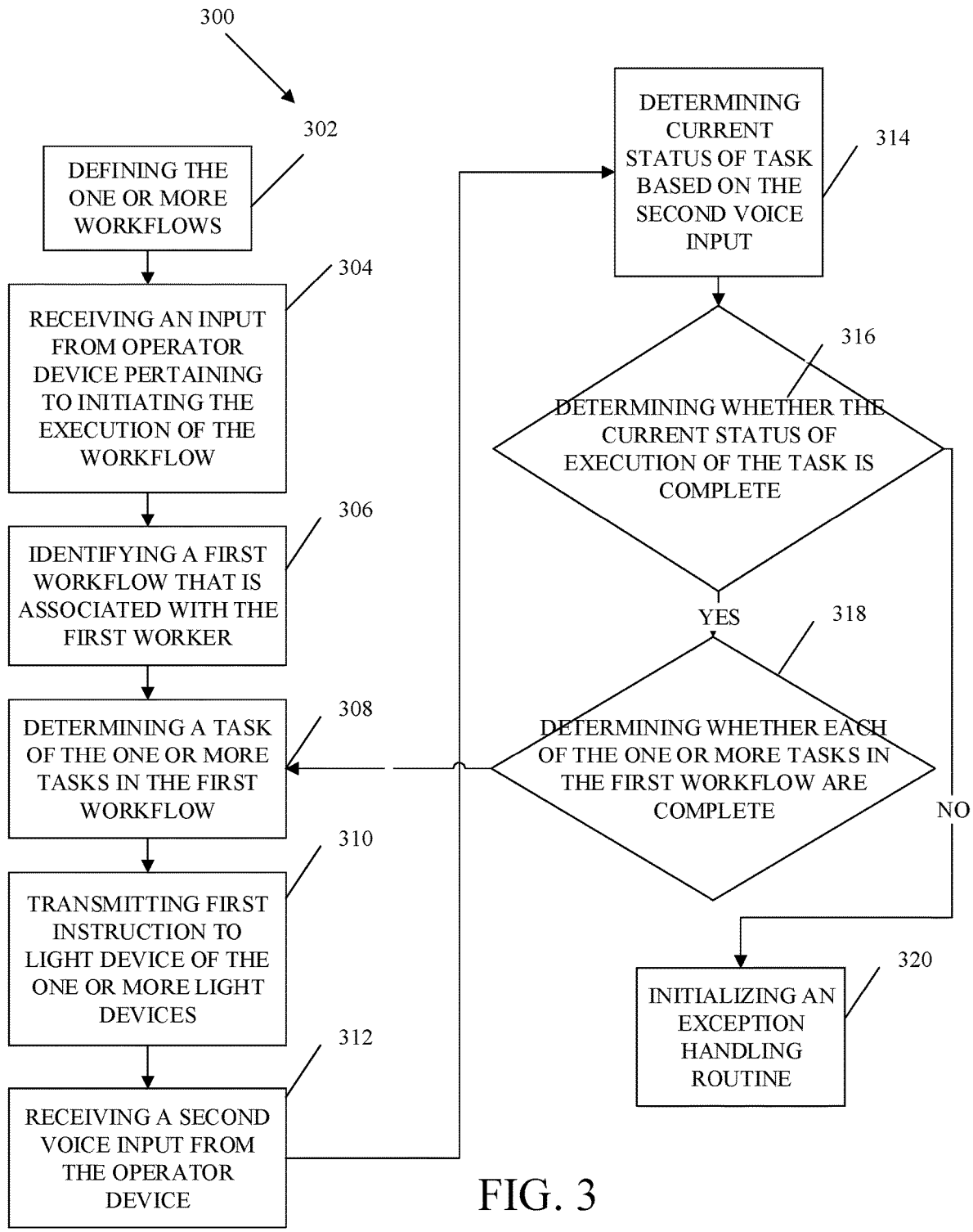
FIG. 3 illustrates a flowchart of a method for operating the central server, according to one or more embodiments described herein.

FIG. 3 illustrates a flowchart 300 of a method for operating the central server 106, according to one or more embodiments described herein.

At step 302, the central server 106 includes means such as the first processor 202, the first memory device 204, the first communication interface 206, the first workflow management unit 208, and/or the like for defining the one or more workflows. In an example embodiment, the first workflow management unit 208 may be configured to present an interface to the supervisor worker on a remote computing device (not shown). In some examples, the interface may display a set of tasks that are to be assigned to the one or more workers (such as the first worker 110) in the workplace 100. In some examples, each task in the set of tasks may have an associated first metadata. In some examples, the first metadata associated with the task may include at least a type of task, a primary location in the workplace where the task is to be executed, a first quantity of items to be picked or placed at the location, one or more alternate locations at which the task can be executed, consumer associated with the task, first check digits associated with the task, and/or the like. Further, the type of the task may include, at least one of a picking task, a placing task, a validating task, and/or the like. In an example embodiment, the first check digits associated with the task may correspond to a set of digits that may be inputted by the one or more workers through the respective operator devices (such as the operator device 102) to indicate a status of the execution of the task. Following table illustrates an example first metadata associated with each task in the set of tasks:

TABLE 1

First metadata associated with the set of tasks

| Set of tasks | Type of task | Primary location | Secondary Location | First quantity of items to be picked or placed | Consumer associated with the task | First check digits |
|---|---|---|---|---|---|---|
| Task-1 | Picking Task | Aisle-1; Shelf 2; compartment-5 | Aisle-1; Shelf 5; compartment-19 | 5 | Consumer-1 | 9654 |
| Task-2 | Placing Task | Aisle-5; Shelf 2; compartment-10 | Aisle-2; Shelf 6; compartment-18 | 2 | Consumer-2 | 4321 |
| Task-3 | Picking Task | Aisle-30; Shelf 2; compartment-5 | Aisle-3; Shelf 9; compartment-6 | 3 | Consumer-1 | 7894 |

In some examples, based on the first metadata, the supervisor worker may provide input through the remote computer to define the one or more workflows such that each of the one or more workflows includes one or more tasks of the set of tasks. For example, the one or more tasks in a workflow of the one or more workflows may be of same type. In another example, the primary location of each of the one or more tasks (in the workflow) may be within a predefined distance range (for example, 10 meters). Additionally, the supervisor worker may provide input to the remote computer to define a sequence in which the one or more tasks are to be executed. For example, the supervisor worker may provide the input to the remote computer to define that the task-1 has to be executed prior to task-3. Further, the supervisor worker may provide input to the remote computer to associate the one or more workflows with the one or more workers working in the workplace 100. In an example embodiment, the supervisor worker may provide input to the remote computer to associated each of the one or more workflows with the unique ID associated with each of the one or more workers. For example, the supervisor worker may provide input to the remote computer to associate a first workflow of the one or more workflows with the unique ID of the first worker 110.

In some examples, the scope of the disclosure is not limited to the supervisor worker providing the input to the remote computer to define the workflow. In an alternative embodiment, the first workflow management unit 208 may automatically define the workflow without the intervention of the supervisor worker. In such an embodiment, the first workflow management unit 208 may be configured to generate the one or more workflows based on one or more workflow creation rules. For example, the first workflow management unit 208 may utilize the one or more workflow creation rules to identify the one or more tasks that are of the same type and/or have the associated primary locations within the predefined distance range (for example, 0-20 meters from each other). Thereafter, the first workflow management unit 208 create the one or more workflows having the one or more identified tasks. In another example, the first workflow management unit 208 may utilize the one or more workflow creation rules to identify the one or more tasks that have same associated consumer. Thereafter, the first workflow management unit 208 may create the one or more workflows containing the one or more identified tasks.

The aforementioned example has been described for illustrative purposes and the scope of the disclosure is not limited to the aforementioned example. A person having ordinary skills in the art would envision other similar scenarios of the creating workflows automatically.

At step 304, the central server 106 includes means such as the first processor 202, the first memory device 204, the first communication interface 206, the first workflow management unit 208, and/or the like for receiving an input from the operator device 102 pertaining to initiating the execution of the workflow.

In an example embodiment, the operator device 102 may provide the input to the first workflow management unit 208 based on an input received from the first worker 110. In some examples, the first worker 110 may use the operator device 102 to scan and decode a predefined barcode. In an example embodiment, the predefined barcode may include information that the first worker 110 is ready to execute the workflow. For example, the information may include a phrase "Ready" that may indicate that the first worker 110 is ready to execute the workflow. Upon decoding the barcode and retrieving the information, the operator device 102 may be configured to transmit the information to the first workflow management unit 208 (in the central server 106) as the input. In some examples, the scope of the disclosure is not limited to the information being the phrase "Ready". In an alternative embodiment, the information may correspond to the unique ID associated with the first worker 110. For the purpose of the ongoing description, it is considered that the information (that is transmitted to the first workflow management unit 208 as the input) includes the unique ID of the first worker 110.

In some examples, the scope of the disclosure is not limited to the first worker 110 scanning the predefined barcode containing the information indicating that the worker is ready to execute the workflow. Additionally or alternately, the first worker 110 may utilize the operator device 102 to scan a barcode that includes information indicating the workflow that the first worker 110 may have to execute/perform. In such an embodiment, the first worker 110 may utilize the operator device 102 to scan a barcode printed on a carton or a container. The carton or the container may be configured to store items that are to be delivered to a consumer (for example consumer-1). Further, in such an embodiment, the information in the barcode (printed on the carton) may include information pertaining to the consumer associated with the carton or the container. Accordingly, upon decoding the barcode, the operator device 102 may be configured to transmit the information pertaining to the consumer to the first workflow management unit 208, as the input.

In some examples, the scope of the disclosure is not limited to the operator device 102 receiving the information (indicating that the first worker 110 is ready to execute the workflow) by decoding the predefined barcode. Additionally or alternately, the operator device 102 may be configured to receive the information (indicating that the first worker 110 is ready to execute the workflow) directly from the first worker 110. In such an embodiment, the first worker 110 may utilize the speech microphone 118 to provide a first voice input indicating that the first worker 110 is ready to initiate the execution of the workflow. For example, the first worker 110 would speak the phrase "Ready" in the microphone 118 to indicate that he/she is ready to initiate execution of the workflow. Upon receiving the first voice input, the operator device 102 may be configured to utilize SST techniques to convert the first voice input to text. Thereafter, the operator device 102 may be configured to transmit the text as the input to the first workflow management unit 208. In an alternate embodiment, the operator device 102 may be configured to receive the first voice input that may be deterministic of the consumer that may be associated with carton/container (that is configured to store the one or more items to be delivered to the consumer). For example, the first voice input may correspond to a carton ID printed on the carton. In yet another embodiment, the first voice signal may indicate the unique ID of the first worker 110. Upon receiving the first voice input, the operator device 102 may be configured to utilize SST techniques to convert the first voice input to text. Thereafter, the operator device 102 may be configured to transmit the text as the input to the first workflow management unit 208.

At step 306, the central server 106 includes means such as the first processor 202, the first memory device 204, the first communication interface 206, the first workflow management unit 208, and/or the like for identifying the first workflow, of the one or more workflows, that is associated with the first worker 110. In some examples, the first workflow management unit 208 may be configured to identify the first workflow based on the information received from the operator device 102 in the step 304. As discussed, the information includes the unique ID of the first worker 110, accordingly, the first workflow management unit 208 may utilize the unique ID of the first worker 110 to identify the first workflow associated with the first worker 110. In an alternate embodiment, where the information received from the operator device 102 corresponds to the identification of the carton/container. In such an embodiment, the first workflow management unit 208 may be configured to utilize a second look-up table to identify a workflow associated with the carton ID. Following table illustrates an example second look-up table illustrating the mapping between the carton ID and the associated workflow:

TABLE 2

Second look-up table illustrating a mapping between the carton ID and the one or more workflows.

| Carton ID | One or more workflow |
|---|---|
| 123456 | Workflow-1 |
| 789012 | Workflow-2 |

Thereafter, the first workflow management unit 208 may be configured to assign the identified workflow (i.e., the first workflow) to the first worker 110.

At step 308, the central server 106 includes means such as the first processor 202, the first memory device 204, the first communication interface 206, the first workflow management unit 208, and/or the like for determining a task of the one or more tasks in the first workflow (associated with the first worker 110) that is to be executed by the first worker 110. In an example embodiment, the first workflow management unit 208 may be configured to identify the task based on the predetermined sequence in which the one or more tasks are to be executed (i.e., the sequence defined by the supervisor worker during creation of the first workflow, as is described in the step 302). For example, the first workflow management unit 208 may determine, based on the sequence, that the task-1 (refer table 1) of the one or more tasks (e.g., task-1 and task-3) is to be executed first followed by task-3.

In an alternate embodiment, the first workflow management unit 208 may determine the task of the one or more tasks (to be executed by the first worker 110) based on at least the first metadata associated with the one or more tasks. For example, the first workflow management unit 208 may determine the task of the one or more tasks based on the primary location where the one or more tasks are to be executed and a current location of the first worker 110 in the workplace 100. In such an embodiment, the first processor 202 may receive the location of the operator device 102 from the operator device 102. Since the operator device 102 is carried by the first worker 110, the first processor 202 may consider the location of the operator device 102 as the current location of the first worker 110. Thereafter, the first workflow management unit 208 may be configured to determine the task, of the one or more tasks in the first workflow, that has the primary location (i.e., the location where the task is to be executed) nearest to the current location of the first worker 110. Accordingly, the first workflow management unit 208 may consider the determined task as the task to be executed by the first worker 110.

At step 310, the central server 106 includes means such as the first processor 202, the first memory device 204, the first communication interface 206, the first workflow management unit 208, the light device interface unit 210, and/or the like for transmitting the first instruction to a light device (e.g., the light device 104a) of the one or more light devices 104. The method of transmitting the first instruction to the light device 104a is further described in conjunction with FIG. 4.

Figure 4:
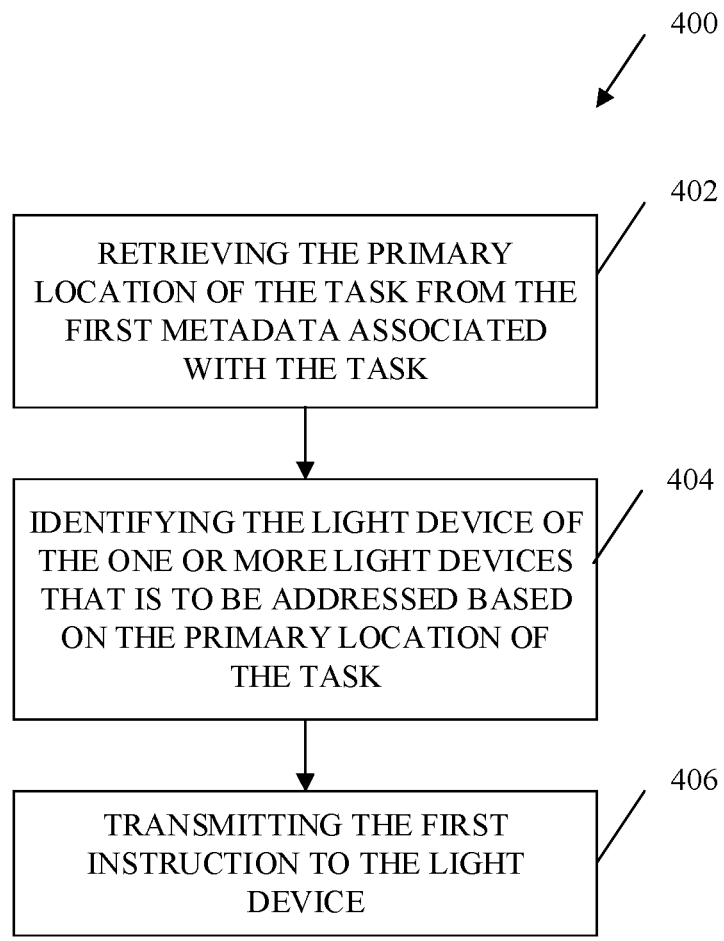
FIG. 4 illustrates a flowchart of a method for transmitting a first instruction to a light device, according to one or more embodiments described herein.

FIG. 4 illustrates a flowchart 400 of a method for transmitting the first instruction to the light device 104a, according to one or more embodiments described herein.

At step 402, the central server 106 includes means such as the first processor 202, the first memory device 204, the first communication interface 206, the first workflow management unit 208, the light device interface unit 210, and/or the like for retrieving the primary location of the task (determined in the step 308) from the first metadata associated with the task. For instance, if the task (determined in the step 308) is the task-1 (refer table 1), the light device interface unit 210 determines the primary location as "Aisle-1; Shelf-2; Compartment-5".

At step 404, the central server 106 includes means such as the first processor 202, the first memory device 204, the first communication interface 206, the first workflow management unit 208, the light device interface unit 210, and/or the like, for identifying the light device (e.g., the light device 104a) of the one or more light devices 104 that is to be addressed based on the primary location of the task (determined in the step 308). In an example embodiment, the light device interface unit 210 may be configured to identify the light device 104a of the one or more light devices 104 based on the primary location associated with the task, and the first look-up table that includes a mapping between the one or more light devices 104 and the one or more locations where the one or more light devices 104 have been installed. Following table illustrates an example first look-up table:

TABLE 3

An example first look-up table illustrating a mapping between the one or more light devices and the one or more locations where the one or more light devices have been installed.

| One or more light devices | Location |
| --- | --- |
| Light device-1 | Aisle-1; Shelf-2; Compartment-5 |
| Light device-2 | Aisle-5; Shelf 2; compartment-10 |
| Light device-3 | Aisle-30; Shelf 2; compartment-5 |

For example, if the primary location at which the task is to be executed is "Aisle-1; Shelf-2; Compartment-5", the light device interface unit 210 may determine that (from table 3) at the location "Aisle-1; Shelf-2; Compartment-5", the Light device-1 is installed. Accordingly, the light device interface unit 210 identifies the "Light device-1" as the light device 104a.

At step 406, the central server 106 includes means such as the first processor 202, the first memory device 204, the first communication interface 206, the first workflow management unit 208, the light device interface unit 210, and/or the like, for transmitting the first instruction to the light device 104a. In an example embodiment, the first instruction includes a command deterministic of whether to activate the LED/LASER in the light device 104a, and a first portion of the first metadata associated with the task (determined in the step 308). For example, the first portion of the first metadata includes, but not limited to, a first quantity of the item to be picked from the primary location. Following table illustrates an example first instruction:

TABLE 4

An example of the first instruction.

| Command | First portion of the first metadata(first quantity of items to be picked from primary location) |
| --- | --- |
| Activate | 5 |

Upon receiving the first instruction, the light device 104a may activate/deactivate the LED/LASER based on the command mentioned in the first instruction. Further, the light device 104a may display the first portion of the first metadata on the display screen 126 associated with the light device 104a.

Figure 5:
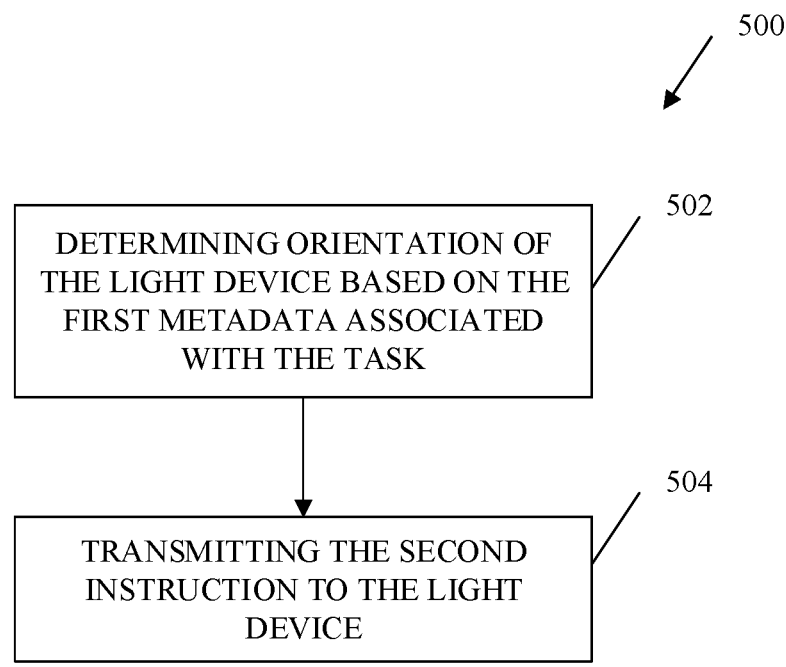
FIG. 5 illustrates a flowchart of another method for transmitting the first instruction to the light device, according to one or more embodiments described herein.

In an example embodiment, where the light device 104c is installed at a central location in the workplace 100, the light device interface unit 210 may perform the method described in FIG. 5 to transmit a second instruction to the light device 104c to causes the light device 104c to point at the primary location of the task.

FIG. 5 illustrates a flowchart 500 of another method for transmitting the first instruction to the light device 104, according to one or more embodiments described herein.

At step 502, the central server 106 includes means such as the first processor 202, the first memory device 204, the first communication interface 206, the first workflow management unit 208, the light device interface unit 210, and/or the like, for determining the orientation of the light device 104c based on the first metadata associated with the task (determined in the step 308). As discussed, the orientation of the light device 104c, installed at the central location, may be modifiable in order to enable the light device 104c to point at the location where the task is to be executed. Accordingly, in an example embodiment, the light device interface unit 210 may be configured to determine the orientation of the light device 104c.

In an example embodiment, the light device interface unit 210 may be configured to determine the orientation of the light device 104c based on the primary location of the task (determined from the first metadata associated with the task). In some examples, the light device interface unit 210 may utilize a third look-up table that includes a mapping between the primary location of the task and the orientation of the light device 104c that will enable the light device 104c to point at the primary location of the task. In some examples, the third look-up table may be pre-stored in the first memory device 204 during initial configuration of the central server 106. Following is an example third look-up table:

TABLE 5

An example third look-up table

| Primary location | Orientation of the light device 104c |
| --- | --- |
| Aisle-1; Shelf-2; Compartment-5 | Pan 30 degrees, Tilt 50 degrees |
| Aisle-5; Shelf 2; compartment-10 | Pan 45 degrees, Tilt 50 degrees |
| Aisle-30; Shelf 2; compartment-5 | Pan 20 degrees, Tilt 75 degrees |

For example, referring to the table 5, if the light device interface unit 210 determines (from the first metadata associated with the task) that the task is to be executed at Aisle-1; Shelf-2; Compartment-5, the light device interface unit 210 may determine that the orientation of the light device 104c needs to be "Pan 30 degrees, Tilt 50 degrees" in order to enable the light device 104c to point at the Aisle-1; Shelf-2; Compartment-5.

At step 504, the central server 106 includes means such as the first processor 202, the first memory device 204, the first communication interface 206, the first workflow management unit 208, the light device interface unit 210, and/or the like, for transmitting the second instruction to the light device 104c. In an example embodiment, the second instruction may include the command deterministic of whether to activate the LED/LASER in the light device 104c, the first portion of the first metadata associated with the task (determined in the step 308), and information pertaining to the orientation of the light device 104c. Following table illustrates an example second instruction:

TABLE 6

An example second instruction

| Command | Portion of the first metadata | Orientation of the light device 104c |
|---|---|---|
| Activate | 5 | Pan 30 degrees, Tilt 50 degrees |

Upon receiving the second instruction, the light device 104c may activate/deactivate the LED/LASER based on the command mentioned in the second instruction. Further, the light device 104c may modify the respective orientation based on the information pertaining to the orientation received in the second instruction. For example, the light device 104c may actuate the internal motors to modify the respective orientation. Furthermore, the light device 104c may utilize the LED/LASER to project the portion of the first metadata at the primary location of the task.

In an example embodiment, after the light device 104c activates the respective LED/LASER, the first worker 110 may view the projected LED/LASER to determine the primary location at which the task is to be executed. Further, the first worker 110 may view the first portion of the first metadata being projected by the light device 104c at the primary location. Based on the first portion of the first metadata, the first worker 110 may perform the task.

Referring back to FIG. 3, at step 312, the central server 106 includes means such as the first processor 202, the first memory device 204, the first communication interface 206, the first workflow management unit 208, and/or the like for receiving a second voice input from the operator device 102. In an example embodiment, the first worker 110 may provide the second voice input to the operator device 102 during execution of the task or upon completion of the task. In some examples, the second voice input may be indicative of a current status of the execution of the task. For example, the first worker 110 may speak the phrase "complete" to indicate the completion of the task. In an alternate embodiment, the first worker 110 may speak the phrase "exception" to indicate an exception encountered during execution of the task. After receiving the second voice input from the first worker 110, the operator device 102 may be configured to transmit the second voice input to the first workflow management unit 208.

In some examples, the scope of the disclosure is not limited to the first worker 110 providing the phrase "complete" or "exception" as the second voice input to indicate the current status of the task. In an alternate embodiment, the worker may provide the second voice input indicating a second metadata associated with execution of the task. In an example embodiment, the second metadata associated with the execution of the task may include information pertaining to at least an operation performed by the first worker 110. For example, the second metadata may include at least a second quantity of items picked or placed by the first worker 110, and/or a second check digits associated with execution of the task (inputted by the first worker 110). Upon receiving the second voice input from the first worker 110, the operator device 102 may be configured to transmit the second voice input to the first workflow management unit 208 in the central server 106. For the purpose of ongoing description, it is considered that the second metadata associated with the execution of the task includes the second quantity of items picked or placed by the first worker 110.

At step 314, the central server 106 includes means such as the first processor 202, the first memory device 204, the first communication interface 206, the first workflow management unit 208, and/or the like for determining the current status of the task based on the received second voice input. In an example embodiment, the determination of the current status of the execution of the task is further described in conjunction with FIG. 6.

Figure 6:
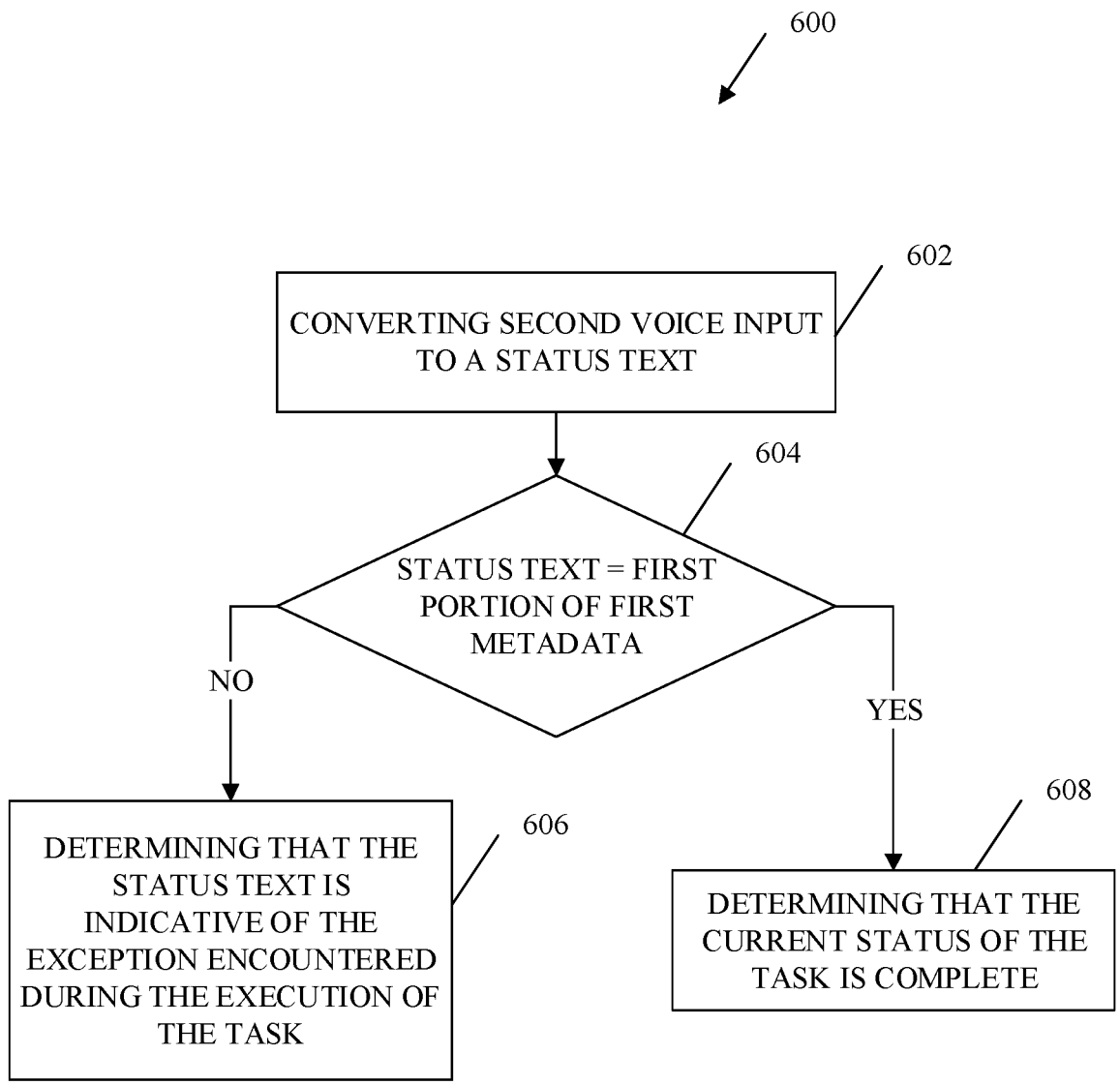
FIG. 6 illustrates a flowchart of a method for determining a current status of a task, according to one or more embodiments described herein.

FIG. 6 illustrates a flowchart 600 of a method for determining the current status of the task, according to one or more embodiments described herein.

At step 602, the central server 106 includes means such as the first processor 202, the first memory device 204, the first communication interface 206, the first workflow management unit 208, and/or the like for converting the second voice input to a status text using one or more STT techniques.

At step 604, the central server 106 includes means such as the first processor 202, the first memory device 204, the first communication interface 206, the first workflow management unit 208, and/or the like for comparing the status text with the first portion of the first metadata associated task. As discussed, the status text indicates the second metadata associated with the execution of the task and the second metadata includes the second quantity of items picked or placed by the first worker 110. Further, as discussed, the first portion of the first metadata includes the first quantity of items to be picked from the primary location. Accordingly, the first workflow management unit 208 may be configured to compare the second quantity of items picked or placed by the first worker 110 with the first quantity of items to be picked from the primary location.

If the first workflow management unit 208 determines that the second quantity of items is same the first quantity of the items to be picked by the first worker 110 from the primary location, the first workflow management unit 208 may be configured to perform the step 608. However, if the first workflow management unit 208 determines that the second quantity of items is different from the first quantity of items to be picked by the first worker 110 from the primary location, the first workflow management unit 208 may be configured to perform the step 606.

At step 606, the central server 106 includes means such as the first processor 202, the first memory device 204, the first communication interface 206, the first workflow management unit 208, and/or the like for determining that the status text (generated from the second voice input received from the operator device 102) is indicative of the exception encountered during the execution of the task. Further, the exception during execution of task may indicate incomplete status of the task.

At step 608, the central server 106 includes means such as the first processor 202, the first memory device 204, the first communication interface 206, the first workflow management unit 208, and/or the like for determining that the current status of the task is complete.

In some examples, the scope of the disclosure is not limited to comparing the status text with the first portion of the metadata (pertaining to the first quantity of items to be picked from the primary location) to determine the current status of the task. In an example scenario, where the status text indicates the second check digits associated with execution of the task, the central server 106 may be configured to determine the current status of the task based on methodology described in FIG. 7.

Figure 7:
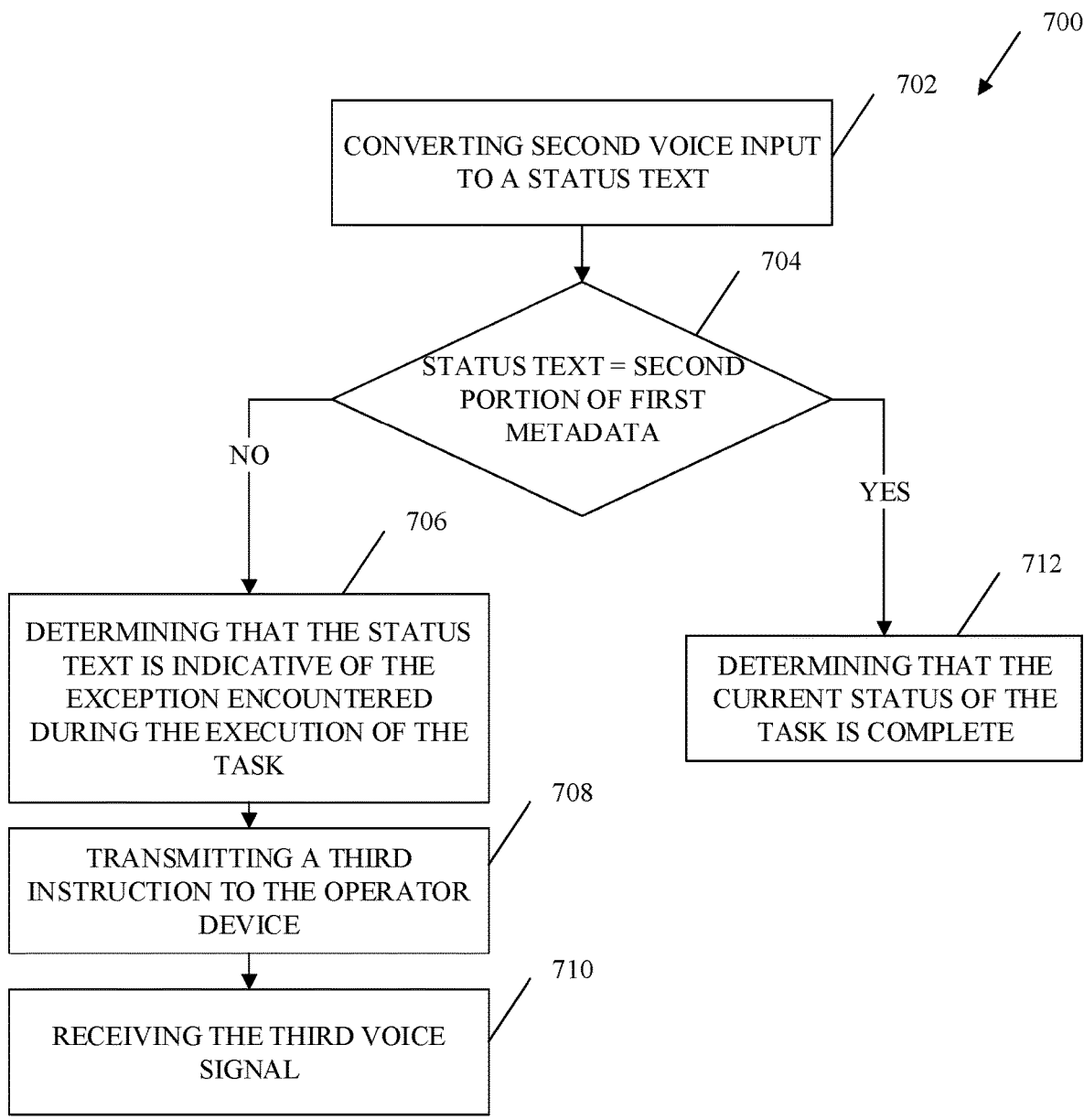
FIG. 7 illustrates a flowchart of another method for determining the current status of the task, according to one or more embodiments described herein.

FIG. 7 illustrates a flowchart 700 of another method for determining the current status of the task, according to one or more embodiments described herein.

At step 702, the central server 106 includes means such as the first processor 202, the first memory device 204, the first communication interface 206, the first workflow management unit 208, and/or the like for converting the second voice input to the status text using one or more STT techniques. In some examples, the status text may indicate the second check digits associated with execution of the task.

At step 704, the central server 106 includes means such as the first processor 202, the first memory device 204, the first communication interface 206, the first workflow management unit 208, and/or the like for comparing the status text with the second portion of the first metadata associated task. As discussed, the status text indicates the second digits associated with execution of the task. Further, as discussed, the second portion of the first metadata is the first check digits associated with the task. Accordingly, the first workflow management unit 208 may be configured to compare the second check digits with the first check digits associated with the task.

If the first workflow management unit 208 determines that the second check digits (indicated by the status text) is same the first check digits associated with the task, the first workflow management unit 208 may be configured to perform the step 712. However, if the first workflow management unit 208 determines that the second check digits (indicated by the status text) is different from the first check digits, the first workflow management unit 208 may be configured to perform the step 706.

At step 706, the central server 106 includes means such as the first processor 202, the first memory device 204, the first communication interface 206, the first workflow management unit 208, and/or the like for determining that the status text (generated from the second voice input received from the operator device 102) is indicative of the exception encountered during the execution of the task. Further, the exception during execution of task may indicate incomplete status of the task.

At step 708, the central server 106 includes means such as the first processor 202, the first memory device 204, the first communication interface 206, the first workflow management unit 208, and/or the like for transmitting a third instruction to the light device 104a. In an example embodiment, the third instruction may include a prompt or a query pertaining to a reason for the exception encountered during the execution of the task. Upon receiving the third instruction, the light device 104a may display the query on the display screen 126 associated with the light device 104a. The first worker 110 may view the query on the light device 104a and may accordingly, provide a third voice input to the operator device 102 that indicates the reason for the exception encountered during the execution of the task. For example, the first worker 110 may provide the third voice input that the second quantity of items picked from the primary location is short by a third quantity of items. Thereafter, the operator device 102 may transmit the third voice signal to the first workflow management unit 208 in the central server 106.

At step 710 the central server 106 includes means such as the first processor 202, the first memory device 204, the first communication interface 206, the first workflow management unit 208, and/or the like for receiving the third voice signal.

At step 712, the central server 106 includes means such as the first processor 202, the first memory device 204, the first communication interface 206, the first workflow management unit 208, and/or the like for determining that the current status of the task is complete.

Referring back to FIG. 3, at step 316, the central server 106 includes means such as the first processor 202, the first memory device 204, the first communication interface 206, the first workflow management unit 208, and/or the like for determining whether the current status of execution of the task is complete. If the first workflow management unit 208 determines that the current status of the execution of the task is complete, the first workflow management unit 208 is configured to perform the step 318. However, if the first workflow management unit 208 determines that the current status of the execution of the task is incomplete (i.e., the exception encountered during the execution of the task), the first workflow management unit 208 is configured to perform the step 320.

At step 318, the central server 106 includes means such as the first processor 202, the first memory device 204, the first communication interface 206, the first workflow management unit 208, and/or the like for determining whether each of the one or more tasks in the first workflow are complete. If the first workflow management unit 208 determines that each of the one or more tasks are complete, the first workflow management unit 208 may be configured to end the execution of the first workflow. However, if the first workflow management unit 208 determines that at least one task of the one or more tasks (in the first workflow) is yet to be executed by the first worker 110, the first workflow management unit 208 may be configured to repeat the step 308.

At step 320, the central server 106 includes means such as the first processor 202, the first memory device 204, the first communication interface 206, the first workflow management unit 208, and/or the like for initializing an exception handling routine. The exception handling routine is further described in conjunction with FIG. 8.

Figure 8:
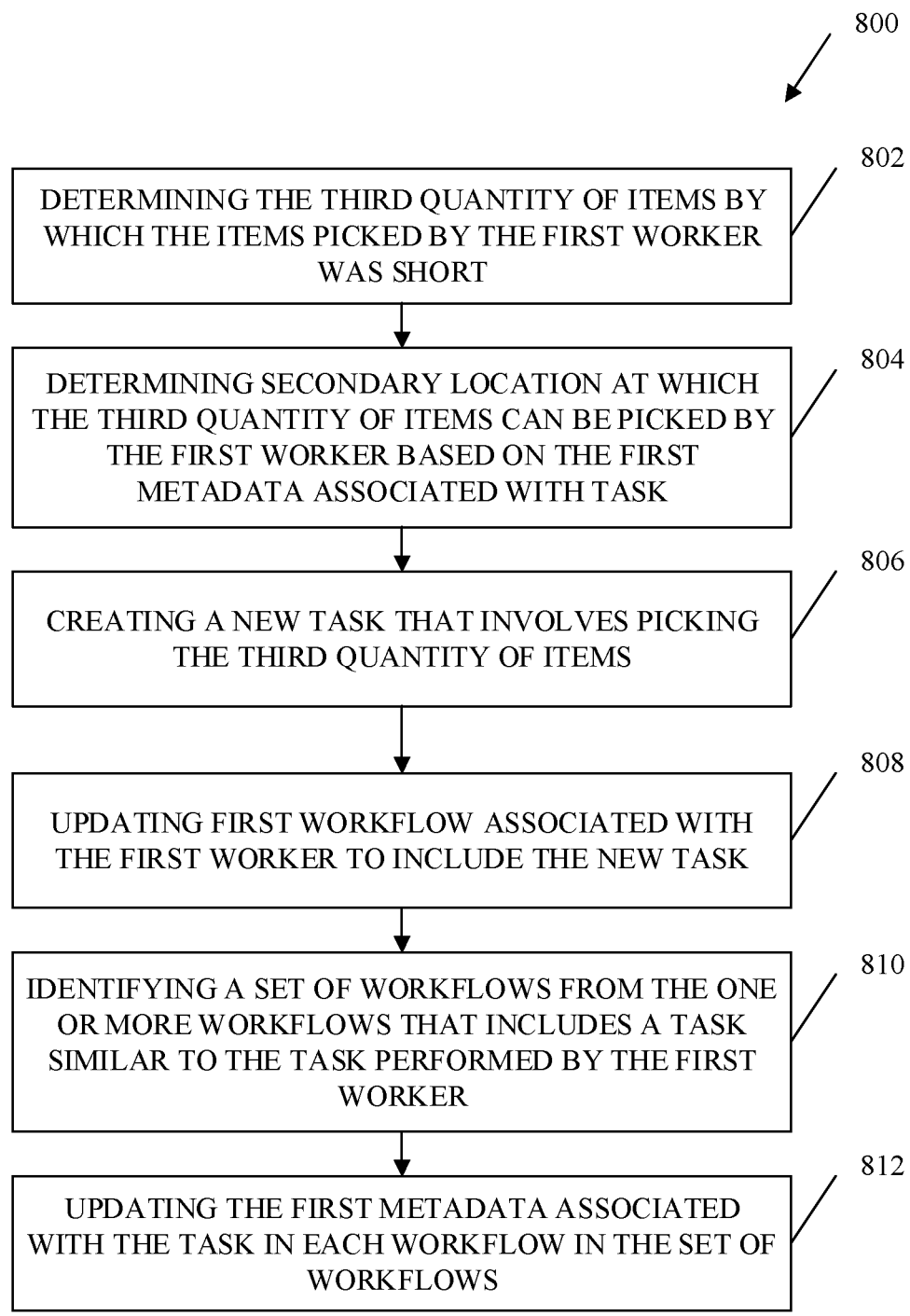
FIG. 8 illustrates a flowchart of a method corresponding to an exception handling routine, according to one or more embodiments described herein.

FIG. 8 illustrates a flowchart 800 of a method corresponding to the exception handling routine, according to one or more embodiments described herein.

At step 802, the central server 106 includes means such as the first processor 202, the first memory device 204, the first communication interface 206, the first workflow management unit 208, and/or the like for determining the third quantity of items by which the items picked by the first worker 110 was short. In an example embodiment, the first workflow management unit 208 may be configured to determine a difference between the second quantity of items indicated by the status text and the first portion of the first metadata (indicating the first quantity of the items to be picked by the first worker 110). In an example embodiment, the difference between the second quantity of items indicated by the status text and the first portion of the first metadata (i.e., the first quantity of items) corresponds to the third quantity of items. In some examples, the first workflow management unit 208 may directly receive the third quantity of items from the first worker 110 (as is described in step 708).

At step 804, the central server 106 includes means such as the first processor 202, the first memory device 204, the first communication interface 206, the first workflow management unit 208, and/or the like for determining a secondary location at which the third quantity of items can be picked by the first worker 110 based on the first metadata associated with task (corresponding to picking the items). As discussed, the first metadata includes information pertaining to the secondary locations at which the task can be executed (Refer table 1). Accordingly, the first workflow management unit 208 may determine the secondary location from the first metadata associated with the task. For example, referring to table 1, for task-1 the first workflow management unit 208 determines that the items can picked from the location "Aisle-1; Shelf 5; compartment-19".

At step 806, the central server 106 includes means such as the first processor 202, the first memory device 204, the first communication interface 206, the first workflow management unit 208, and/or the like for creating a new task that involves picking the third quantity of items (determined in the step 802) from the secondary location (determined in the step 804). At step 808, the central server 106 includes means such as the first processor 202, the first memory device 204, the first communication interface 206, the first workflow management unit 208, and/or the like for updating the first workflow associated with the first worker 110 to include the new task (created in the step 806).

Additionally, at step 810, the central server 106 includes means such as the first processor 202, the first memory device 204, the first communication interface 206, the first workflow management unit 208, and/or the like for identifying a set of workflows from the one or more workflows that includes another task similar to the task executed by the first worker 110 (i.e., to pick items from the primary location). In some examples, the set of workflows may be associated with other workers operating in the workplace 100. Further, at step 812, the central server 106 includes means such as the first processor 202, the first memory device 204, the first communication interface 206, the first workflow management unit 208, and/or the like for updating the first metadata associated with the task in each workflow in the set of workflows. In an example embodiment, the first workflow management unit 208 may be configured to update the primary location of the task. For example, the first workflow management unit 208 may update the primary location of the task to be same as the secondary location of the task.

Figure 9:
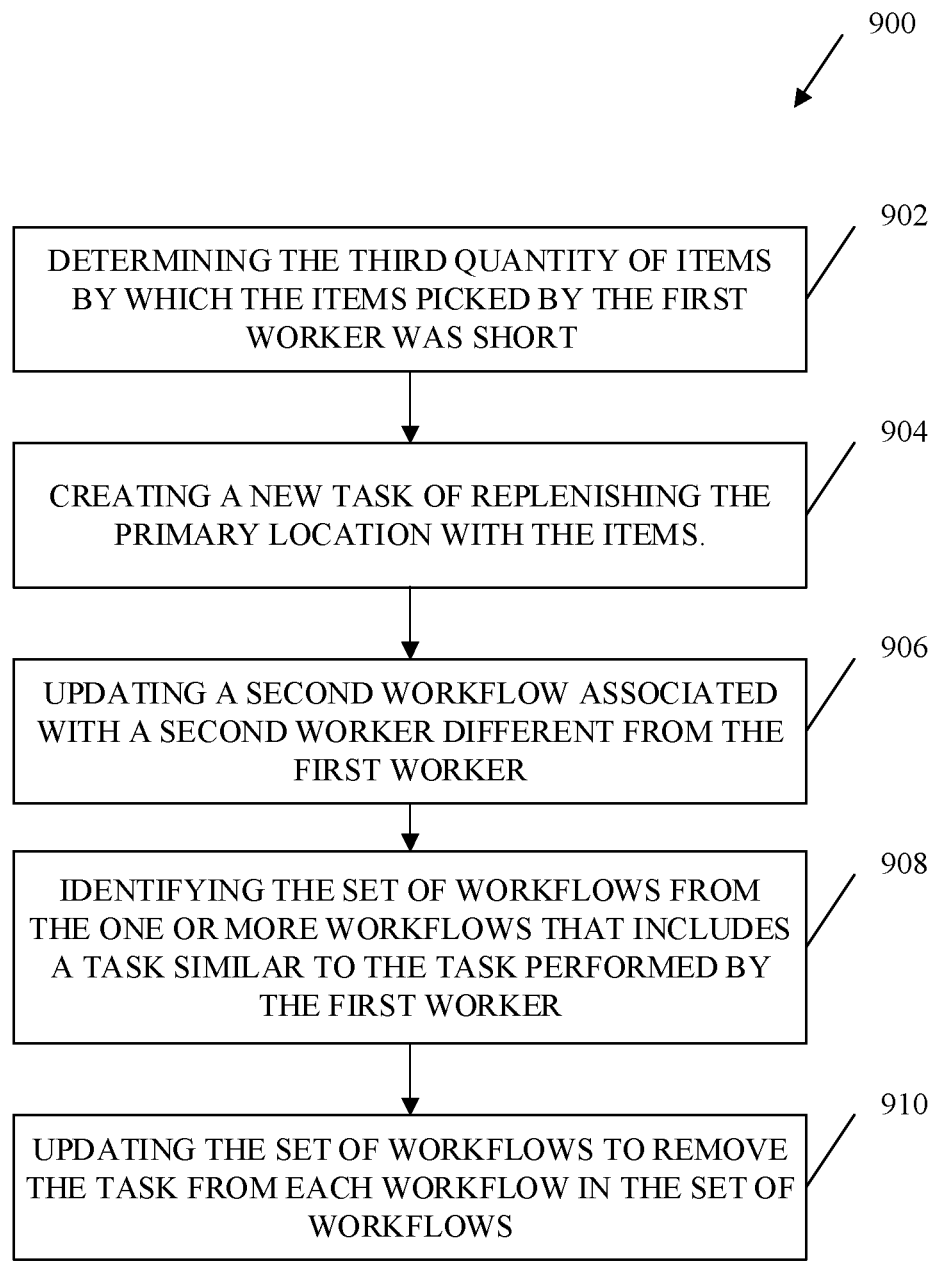
FIG. 9 illustrates a flowchart of another method corresponding to the exception handling routine, according to one or more embodiments described herein.

FIG. 9 illustrates a flowchart 900 of another method corresponding to the exception handling routine, according to one or more embodiments described herein.

At step 902, the central server 106 includes means such as the first processor 202, the first memory device 204, the first communication interface 206, the first workflow management unit 208, and/or the like for determining the third quantity of items by which the items picked by the first worker 110 was short. In an example embodiment, the first workflow management unit 208 may be configured to follow the same methodology as described in the step 802.

At step 904, the central server 106 includes means such as the first processor 202, the first memory device 204, the first communication interface 206, the first workflow management unit 208, and/or the like for creating a new task of replenishing the primary location (where the first worker 110 executed the task) with the items. Further, the first workflow management unit 208 may be configured to define the first metadata associated with the new task. For example, the first workflow management unit 208 may define the following first metadata:

TABLE 6

First metadata associated with the new task.

| Task | Type of task | Primary location | Secondary location | A fourth first quantity of items to be placed |
|---|---|---|---|---|
| Task-2 | Placing Task | Aisle-5; Shelf 2; compartment-10 | Aisle-2; Shelf 6; compartment-18 | 2 |

At step 906, the central server 106 includes means such as the first processor 202, the first memory device 204, the first communication interface 206, the first workflow management unit 208, and/or the like for updating a second workflow associated with a second worker different from the first worker 110. In some examples, the first workflow management unit 208 may be configured to update the second workflow to include the new task.

Additionally, at step 908, the central server 106 includes means such as the first processor 202, the first memory device 204, the first communication interface 206, the first workflow management unit 208, and/or the like for identifying the set of workflows from the one or more workflows that includes another task similar to the task executed by the first worker 110 (i.e., to pick items from the primary location). In some examples, the set of workflows may be associated with different workers operating in the workplace 100. Further, at step 910, the central server 106 includes means such as the first processor 202, the first memory device 204, the first communication interface 206, the first workflow management unit 208, and/or the like for updating the set of workflows to remove the task from each workflow in the set of workflows.

In some examples, the scope of the disclosure is not limited to the central server 106 determining the current status of the task and initializing the exception handling routine. In some examples, some of the functionalities of the central server 106 may be performed by the operator device 102. For example, the operator device 102 may be capable of determining the current status of the task, while the central server 106 may be capable of initializing the exception handling routine, as is further described in conjunction with FIG. 10 and FIG. 13. In yet another example, the operator device 102 may be capable of determining the current status of the task and initializing the exception handling routine, as is described in conjunction with FIGS. 11 and 14.

Figure 10:
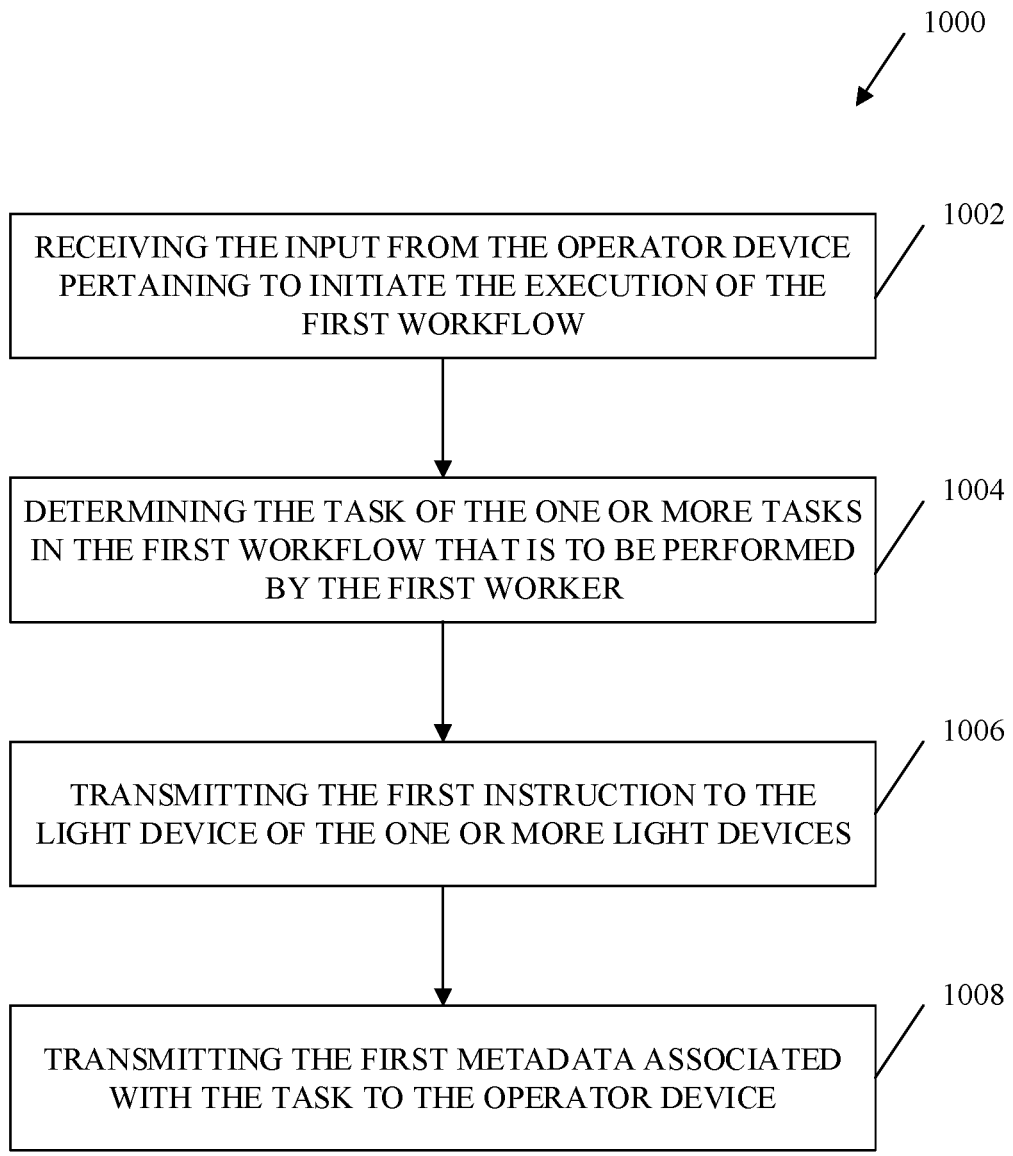
FIG. 10 illustrates a flowchart of a method for operating the central server, according to one or more embodiments described herein.

FIG. 10 illustrates a flowchart 1000 of a method for operating the central server 106, according to one or more embodiments described herein.

At step 1002, the central server 106 includes means such as the first processor 202, the first memory device 204, the first communication interface 206, the first workflow management unit 208, and/or the like for receiving the input from the operator device 102 pertaining to initiate the execution of the first workflow. In an example embodiment, the first workflow management unit 208 may be configured to employ similar methodology as is described in step 304.

At step 1004, the central server 106 includes means such as the first processor 202, the first memory device 204, the first communication interface 206, the first workflow management unit 208, and/or the like for determining the task of the one or more tasks in the first workflow (associated with the first worker 110) that is to be executed by the first worker

110. In an example embodiment, the first workflow management unit 208 may be configured to employ similar methodology as is described in step 308.

At step 1006, the central server 106 includes means such as the first processor 202, the first memory device 204, the first communication interface 206, the first workflow management unit 208, the light device interface unit 210, and/or the like for transmitting the first instruction to the light device 104a of the one or more light devices 104. As discussed, the first instruction includes the first portion of the first metadata associated with the task. In an example embodiment, the first workflow management unit 208 may be configured to perform similar methodology as described in step 310.

Concurrent to the step 1006, at step 1008, the central server 106 includes means such as the first processor 202, the first memory device 204, the first communication interface 206, the first workflow management unit 208, and/or the like for transmitting the first metadata associated with the task to the operator device 102.

During execution of the task, the first worker 110 may provide the second voice input to the operator device 102 pertaining to the status of the execution of the task. Rather than further transmitting the second voice signal to the first workflow management unit 208, the operator device 102 may be configured to utilize known STT techniques to convert the second voice signal to the status text. Thereafter, the operator device 102 may be configured to determine the current status of the execution of the task based on the status text and the first metadata associated with the task, as is further described in conjunction with FIG. 13 and FIG. 14. In an example embodiment, the operator device 102 may be further configured to transmit the current status of the execution of the task to the central server 106. Thereafter, the central server 106 may be configured to perform the steps 316-320.

Figure 11:
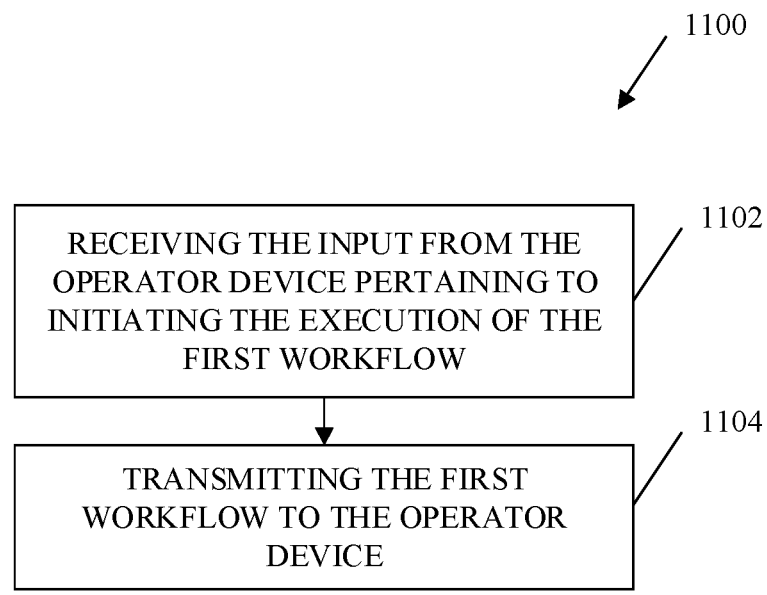
FIG. 11 illustrates a flowchart of another method for operating the central server, according to one or more embodiments described herein.

FIG. 11 illustrates a flowchart 1100 for operating the central server 106, according to one or more embodiments described herein.

At step 1102, the central server 106 includes means such as the first processor 202, the first memory device 204, the first communication interface 206, the first workflow management unit 208, and/or the like for receiving the input from the operator device 102 pertaining to initiating the execution of the first workflow. In an example embodiment, the first workflow management unit 208 may be configured to perform similar methodology as described in step 304.

At step 1104, the central server 106 includes means such as the first processor 202, the first memory device 204, the first communication interface 206, the first workflow management unit 208, and/or the like for transmitting the first workflow to the operator device 102. The execution of the first workflow by the operator device 102 is further described in conjunction with FIG. 13 and FIG. 14.

Figure 12:
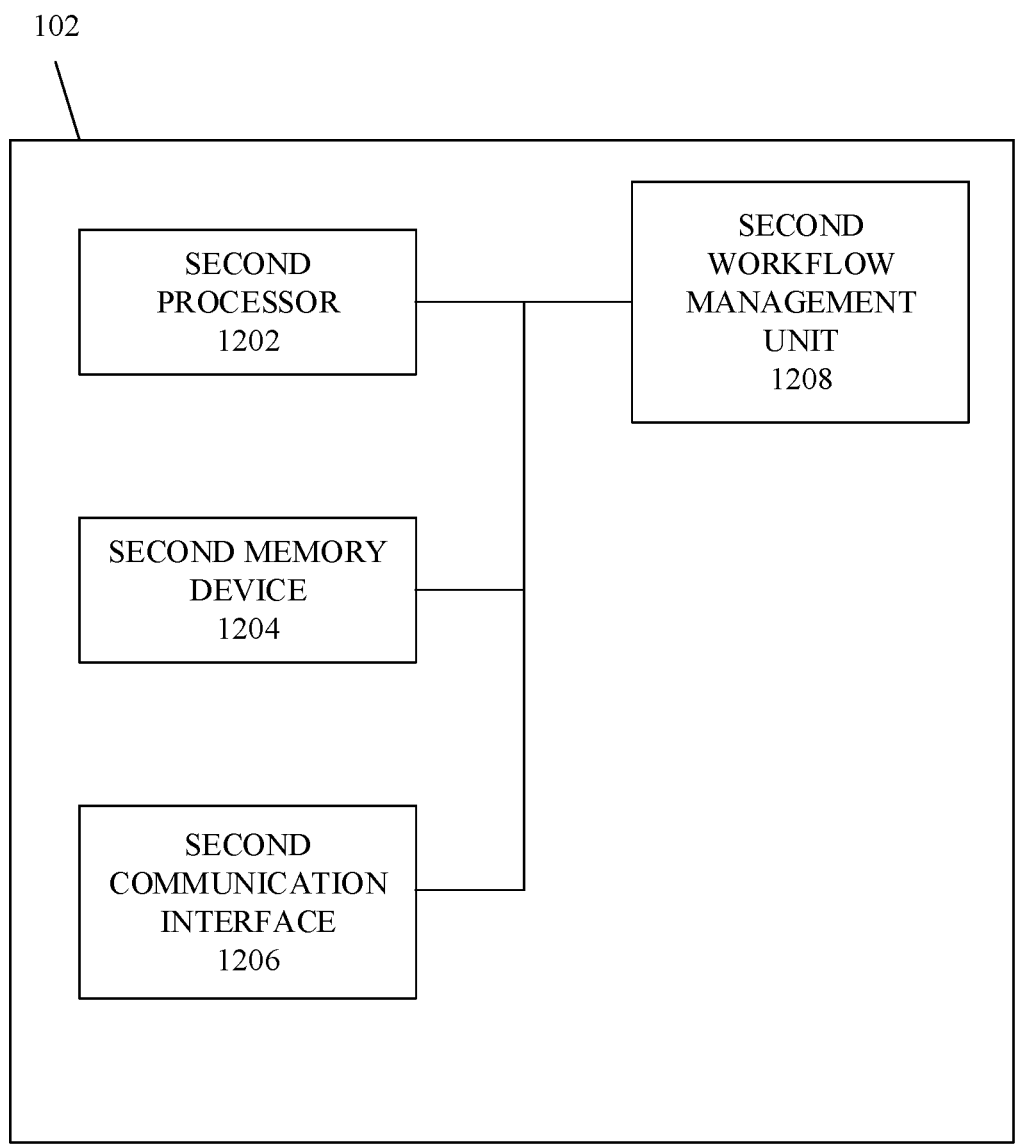
FIG. 12 illustrates a block diagram of an operator device, according to one or more embodiments described herein.

FIG. 12 illustrates a block diagram of the operator device 102, according to one or more embodiments described herein. The operator device 102 includes a second processor 1202, a second memory device 1204, a second communication interface 1206, and a second workflow management unit 1208.

The second processor 1202 may be embodied as means including one or more microprocessors with accompanying digital signal processor(s), one or more processor(s) without an accompanying digital signal processor, one or more coprocessors, one or more multi-core processors, one or more processors, processing circuitry, one or more computers, various other processing elements including integrated circuits such as, for example, an application specific integrated circuit (ASIC) or field programmable gate array (FPGA), or some combination thereof. Accordingly, although illustrated in FIG. 2 as a single processor, in an embodiment, the second processor 1202 may include a plurality of processors and signal processing modules. The plurality of processors may be embodied on a single electronic device or may be distributed across a plurality of electronic devices collectively configured to function as the circuitry of the operator device 102. The plurality of processors may be in operative communication with each other and may be collectively configured to perform one or more functionalities of the circuitry of the operator device 102, as described herein. In an example embodiment, the second processor 1202 may be configured to execute instructions stored in the second memory device 1204 or otherwise accessible to the second processor 1202. These instructions, when executed by the second processor 1202, may cause the circuitry of the operator device 102 to perform one or more of the functionalities, as described herein.

Whether configured by hardware, firmware/software methods, or by a combination thereof, the second processor 1202 may include an entity capable of performing operations according to embodiments of the present disclosure while configured accordingly. Thus, for example, when the second processor 1202 is embodied as an ASIC, FPGA or the like, the second processor 1202 may include specifically configured hardware for conducting one or more operations described herein. Alternatively, as another example, when the second processor 1202 is embodied as an executor of instructions, such as may be stored in the first memory device, the instructions may specifically configure the second processor 1202 to perform one or more algorithms and operations described herein.

Thus, the second processor 1202 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The second memory device 1204 may include suitable logic, circuitry, and/or interfaces that are adapted to store a set of instructions that is executable by the second processor 1202 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an embodiment, the second memory device 1204 may be integrated with the second processor 1202 on a single chip, without departing from the scope of the disclosure.

The second communication interface 1206 may correspond to a communication interface that may facilitate transmission and reception of messages and data to and from various components of the workplace 100. For example, the second communication interface 1206 is communicatively coupled with the central server 106 through the network 108. Examples of the second communication interface 1206 may include, but are not limited to, an antenna, an Ethernet port, a USB port, a serial port, or any other port that can be adapted to receive and transmit data. The second communication interface 1206 transmits and receives data and/or messages in accordance with the various communication protocols, such as Bluetooth® v1.0 through v5.1, Bluetooth Low Energy (BLE), infrared wireless (e.g., IrDA), ultra-wideband (UWB), induction wireless transmission, Wi-Fi, Near Field Communications (NFC), TCP/IP, UDP, 2G, 3G, 4G, 5G, Worldwide Interoperability for Microwave Access (WiMAX), or other proximity-based communications protocols.

The second workflow management unit 1208 may include suitable logic-circuitry that may enable the second workflow management unit 1208 to receive or track the execution of the first workflow. The second workflow management unit 1208 may have similar structure to the first workflow management unit 208. Further, the embodiments applicable on the first workflow management unit 208 may be applicable on the second workflow management unit 1208. In some embodiments, the second workflow management unit 1208 may include a separate processor, specially configured Field Programmable Gate Array (FPGA), or Application Specific Integrated Circuit (ASIC).

Figure 13:
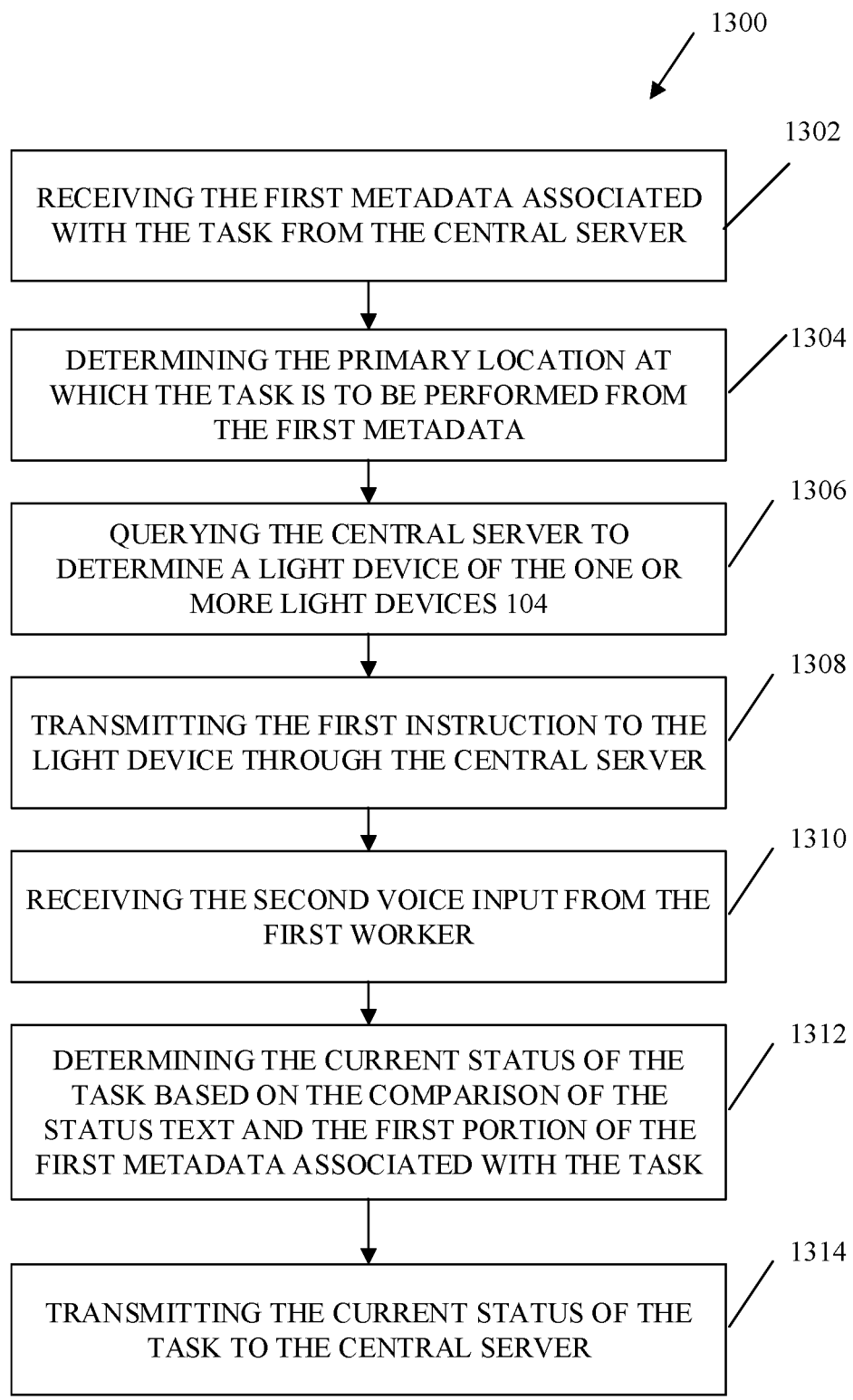
FIG. 13 illustrates a flowchart of a method for operating the operator device, according to one or more embodiments described herein.
Figure 14:
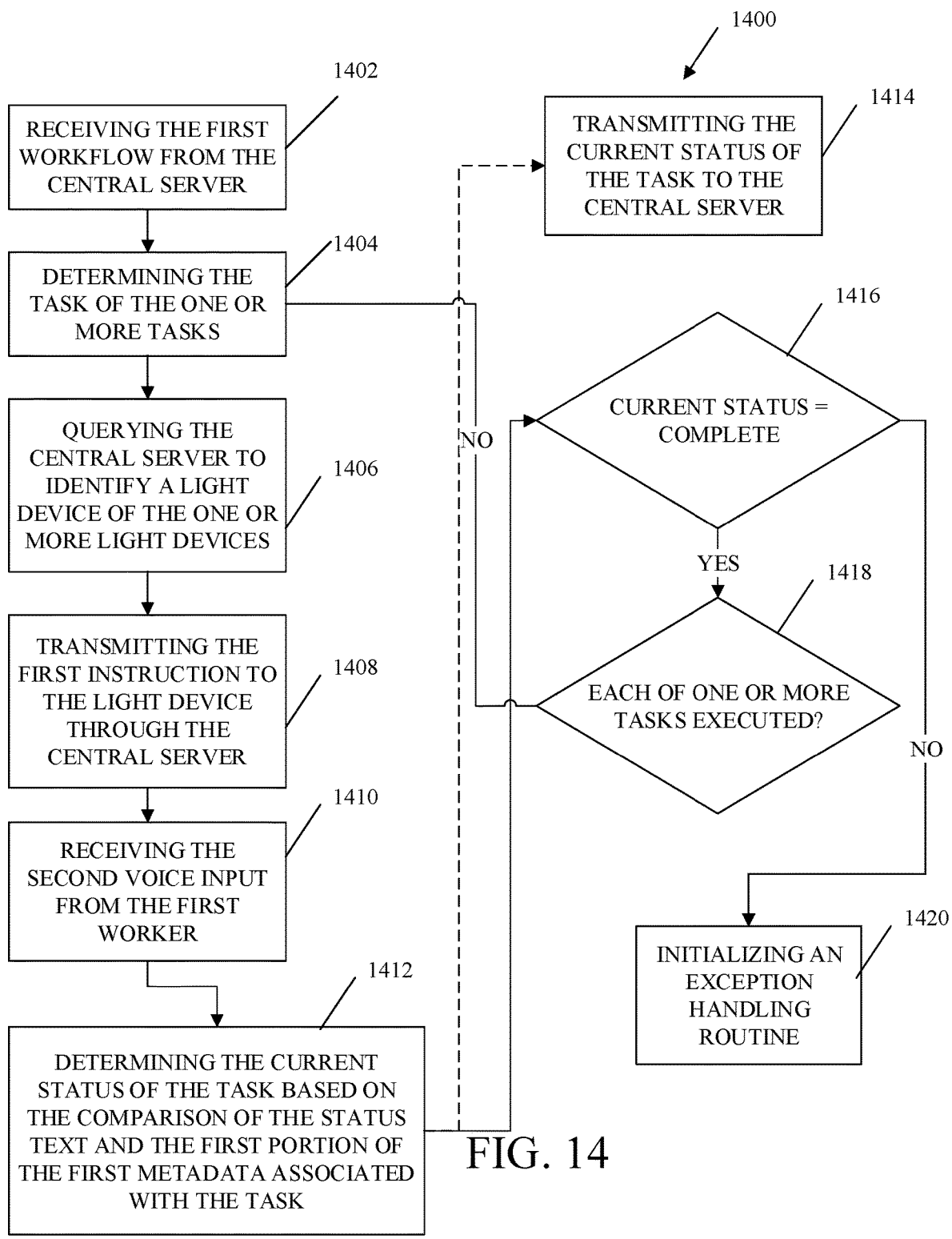
FIG. 14 illustrates a flowchart of a method for operating the operator device, according to one or more embodiments described herein.

The operation of the operator device 102 is further described in conjunction with FIG. 13 and FIG. 14.

FIG. 13 illustrates a flowchart 1300 of a method for operating the operator device 102, according to one or more embodiments described herein.

At step 1302, the operator device 102 includes means such as the second processor 1202, the second memory device 1204, the second communication interface 1206, the second workflow management unit 1208, and/or the like for receiving the first metadata associated with the task from the central server 106. As discussed the central server 106 may be configured to transmit the first metadata associated with the task to the operator device 102, as is described above in the step 1006.

At step 1304, the operator device 102 includes means such as the second processor 1202, the second memory device 1204, the second communication interface 1206, the second workflow management unit 1208, and/or the like for determining the primary location at which the task is to be executed from the first metadata. As discussed, the first metadata associated with the task includes the information pertaining to the primary location where the task is to be executed.

At step 1306, the operator device 102 includes means such as the second processor 1202, the second memory device 1204, the second communication interface 1206, the second workflow management unit 1208, and/or the like for querying the central server 106 to determine the light device (e.g., light device 104a) of the one or more light devices 104 that is installed in proximity to the primary location of the task. For example, the second workflow management unit 1208 may be configured to transmit the primary location of the task in a query to the central server 106. Upon receiving the query, the central server 106 may be configured to refer to the first look-up table (table 3) to determine the light device (e.g., light device 104a) of the one or more light devices 104 installed in proximity to the primary location of the task. In some examples, the central server 106 may transmit the first instruction to the light device 104a to activate the light device 104a. In an alternate embodiment, the central server 106 may transmit information pertaining to the light device 104a to the operator device 102. In such an embodiment, optionally at step 1308, the operator device 102 includes means such as the second processor 1202, the second memory device 1204, the second communication interface 1206, the second workflow management unit 1208, and/or the like for transmitting the first instruction to the light device 104a through the central server 106. In some examples, the second workflow management unit 1208 may directly transmit the first instruction to the light device 104a.

In a scenario, where the central server 106 concurrently transmits the first metadata associated with the task to both the operator device 102 and the light device 104a, the operator device 102 may not perform the steps 1304 to 1308.

At step 1310, the operator device 102 includes means such as the second processor 1202, the second memory device 1204, the second communication interface 1206, the second workflow management unit 1208, and/or the like for receiving the second voice input from the first worker 110. In an example embodiment, the second workflow management unit 1208 may be configured to perform the similar methodology described in the step 312 to receive the second voice signal.

For example, the second workflow management unit 1208 may be configured to utilize known STT techniques to convert the second voice signal to the status text.

At step 1312, the operator device 102 includes means such as the second processor 1202, the second memory device 1204, the second communication interface 1206, the second workflow management unit 1208, and/or the like for determining the current status of the task based on the comparison of the status text and the first portion of the first metadata associated with the task. In some examples, the second workflow management unit 1208 may employ similar methodology as described in the step 314 to determine the current status of the task.

At step 1314, the operator device 102 includes means such as the second processor 1202, the second memory device 1204, the second communication interface 1206, the second workflow management unit 1208, and/or the like for transmitting the current status of the task to the central server 106.

FIG. 14 illustrates a flowchart 1400 of a method for operating the operator device 102, according to one or more embodiments described herein.

At step 1402, the operator device 102 includes means such as the second processor 1202, the second memory device 1204, the second communication interface 1206, the second workflow management unit 1208, and/or the like for receiving the first workflow from the central server 106. In some examples, the central server 106 may identify the first workflow using the methodology described in the step 306. In some examples, the first workflow includes the one or more tasks that are to be executed by the worker 110 associated with the operator device 102.

At step 1404, the operator device 102 includes means such as the second processor 1202, the second memory device 1204, the second communication interface 1206, the second workflow management unit 1208, and/or the like for determining the task of the one or more tasks in the first workflow that is to be executed by the first worker 110. In an example embodiment, the second workflow management unit 1208 may utilize the methodology described in the step 308 to determine the task.

At step 1406, the operator device 102 includes means such as the second processor 1202, the second memory device 1204, the second communication interface 1206, the second workflow management unit 1208, and/or the like for querying the central server 106 to identify the light device (e.g., light device 104*a*) of the one or more light devices 104 that is installed in proximity to the primary location of the task. In an example embodiment, the second workflow management unit 1208 may determine the primary location of the task from the first metadata associated with the task. Thereafter, the second workflow management unit 1208 may be configured to transmit the primary location of the task in the query to the central server 106. Upon receiving the query, the central server 106 may be configured to refer to the first look-up table (e.g., table 3) to determine the light device (e.g., light device 104*a*) of the one or more light devices 104 installed in proximity to the primary location of the task. In some examples, the central server 106 may transmit the first instruction to the light device 104*a* to activate the light device 104*a*. In an alternate embodiment, the central server 106 may transmit information pertaining to the light device 104*a* back to the operator device 102. In such an embodiment, optionally at step 1408, the operator device 102 includes means such as the second processor 1202, the second memory device 1204, the second communication interface 1206, the second workflow management unit 1208, and/or the like for transmitting the first instruction to the light device 104*a* through the central server 106. In some examples, the second workflow management unit 1208 may directly transmit the first instruction to the light device 104*a*.

At step 1410, the operator device 102 includes means such as the second processor 1202, the second memory device 1204, the second communication interface 1206, the second workflow management unit 1208, and/or the like for receiving the second voice input from the first worker 110. In an example embodiment, the second workflow management unit 1208 may be configured to perform the similar methodology described in the step 312 to receive the second voice signal.

Upon receiving the second voice input, the second workflow management unit 1208 may be configured to utilize known STT techniques to convert the second voice signal to the status text.

At step 1412, the operator device 102 includes means such as the second processor 1202, the second memory device 1204, the second communication interface 1206, the second workflow management unit 1208, and/or the like for determining the current status of the task based on the comparison of the status text and the first portion of the first metadata associated with the task. In some examples, the second workflow management unit 1208 may employ similar methodology as described in the step 314 to determine the current status of the task.

At step 1414, the operator device 102 includes means such as the second processor 1202, the second memory device 1204, the second communication interface 1206, the second workflow management unit 1208, and/or the like for transmitting the current status of the task to the central server 106. In some examples, the scope of the disclosure is not limited to the operator device 102 transmitting the current status of the task to the central server 106, at step 1414. In an alternate embodiment, at the step 1416, the operator device 102 includes means such as the second processor 1202, the second memory device 1204, the second communication interface 1206, the second workflow management unit 1208, and/or the like for determining whether the current status of execution of the task is complete. If the second workflow management unit 1208 determines that the current status of the execution of the task is complete, the second workflow management unit 1208 is configured to perform the step 1418. However, if the second workflow management unit 1208 determines that the current status of the execution of the task is incomplete, the second workflow management unit 1208 is configured to perform the step 1420.

At step 1418, the operator device 102 includes means such as the second processor 1202, the second memory device 1204, the second communication interface 1206, the second workflow management unit 1208, and/or the like for determining whether each of the one or more tasks in the second workflow are complete. If the second workflow management unit 1208 determines that each of the one or more tasks are complete, the second workflow management unit 1208 may be configured to end the execution of the second workflow. However, if the second workflow management unit 1208 determines that at least one task of the one or more tasks (in the second workflow) is yet to be executed by the first worker 110, the second workflow management unit 1208 may be configured to repeat the step 1404.

At step 1420, the operator device 102 includes means such as the second processor 1202, the second memory device 1204, the second communication interface 1206, the second workflow management unit 1208, and/or the like for initializing the exception handling routine. In some examples, the operator device may execute the exception handling routine described above conjunction with FIG. 15.

Figure 15:
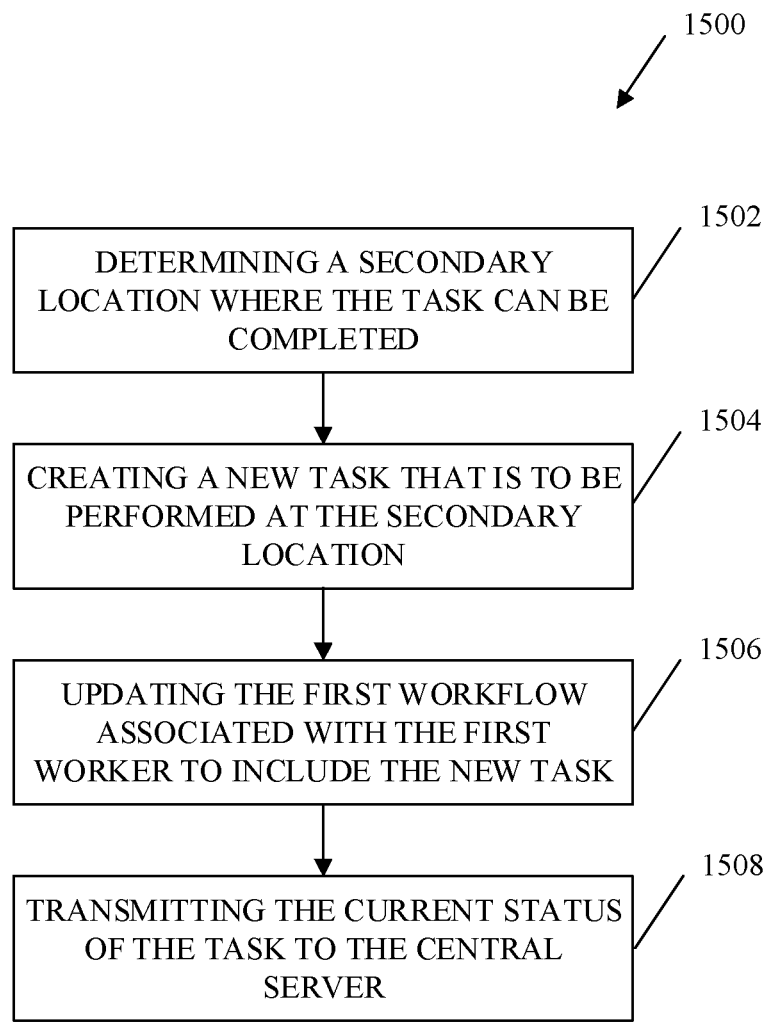
FIG. 15 illustrates a flowchart of a method corresponding to the exception handling routine, according to one or more embodiments described herein.

FIG. 15 illustrates a flowchart 1500 of a method corresponding to the exception handling routine by the operator device 102, according to one or more embodiments described herein.

At step 1502, the operator device 102 includes means such as the second processor 1202, the second memory device 1204, the second communication interface 1206, the second workflow management unit 1208, and/or the like for determining a secondary location where the task can be completed. As discussed, the first metadata associated with the task includes information pertaining to the secondary locations at which the task can be executed (Refer table 1). Accordingly, the second workflow management unit 1208 may determine the secondary location from the first metadata associated with the task. For example, referring to table 1, for task-1 the second workflow management unit 1208 may determine that the items can picked from the location "Aisle-1; Shelf 5; compartment-19".

At step 1504, the operator device 102 includes means such as the second processor 1202, the second memory device 1204, the second communication interface 1206, the second workflow management unit 1208, and/or the like for creating a new task that is to be executed at the secondary location. At step 1506, the operator device 102 includes means such as the second processor 1202, the second memory device 1204, the second communication interface 1206, the second workflow management unit 1208, and/or the like for updating the first workflow associated with the first worker 110 to include the new task.

Additionally, at step 1508, the operator device 102 includes means such as the second processor 1202, the second memory device 1204, the second communication interface 1206, the second workflow management unit 1208, and/or the like for transmitting the current status of the task to the central server 106.

The central server 106, upon receiving the current status of the task, may identify a set of workflows from the one or more workflows that includes another task similar to the task executed by the first worker 110 (i.e., to pick items from the primary location). In some examples, the set of workflows may be associated with different workers operating in the workplace 100. Further, the central server 106 may update the first metadata associated with the task in each workflow in the set of workflows. In an example embodiment, the first workflow management unit 208 may be configured to update the primary location of the task. For example, the central server 106 may update the primary location of the task to be same as the secondary location of the task. Thereafter, the central server 106 may transmit the updated workflow to the operator devices 102 associated with the different workers.

Figure 16:
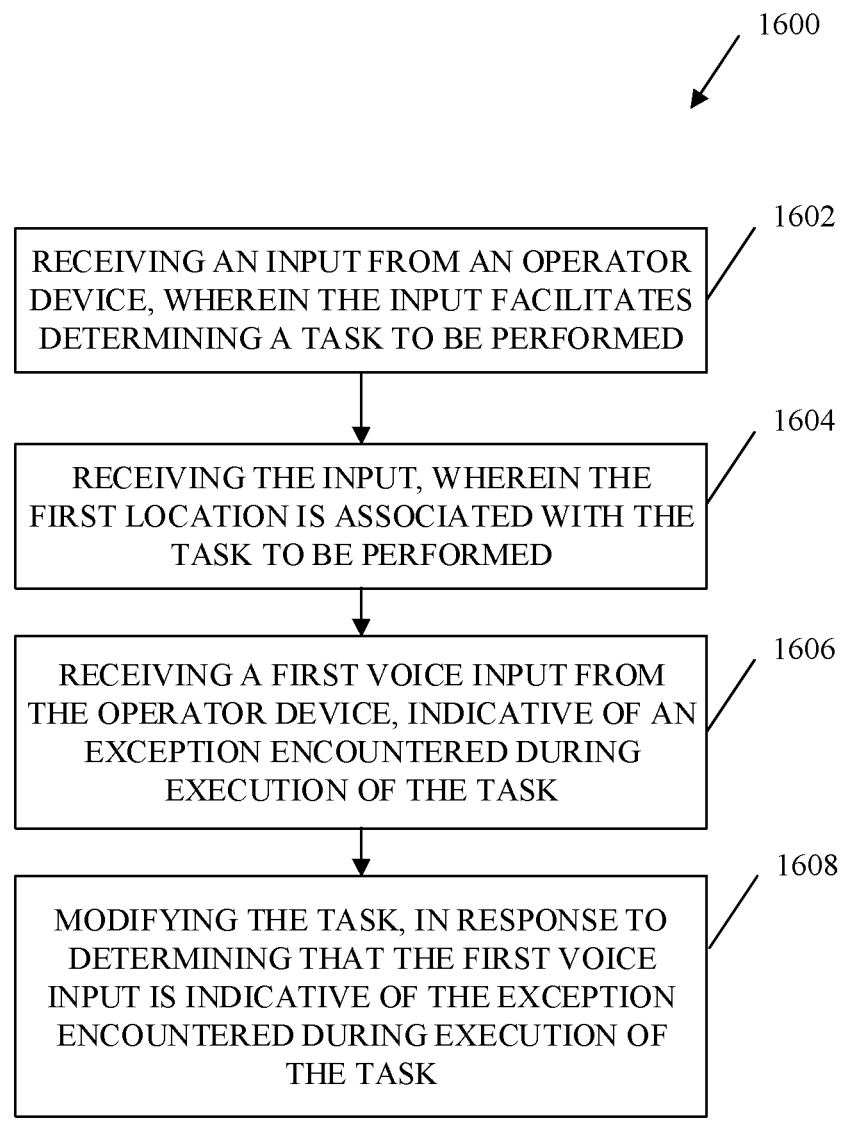
FIG. 16 illustrates a flowchart of method for operating the central server, according to one or more embodiments described herein.

FIG. 16 illustrates a flowchart 1600 of operating the central server 106, according to one or more embodiments described herein.

At step 1602, the central server 106 includes means such as the first processor 202, the first memory device 204, the first communication interface 206, the first workflow management unit 208, and/or the like for receiving an input from an operator device, wherein the input facilitates determining a task to be performed;

At step 1604, the central server 106 includes means such as the first processor 202, the first memory device 204, the first communication interface 206, the first workflow management unit 208, and/or the like for activating a first light device associated with a first location in a workplace in response to receiving the input, wherein the first location is associated with the task to be performed;

At step 1606, the central server 106 includes means such as the first processor 202, the first memory device 204, the first communication interface 206, the first workflow management unit 208, and/or the like for receiving a second voice input from the operator device, indicative of an exception encountered during execution of the task; and At step 1608, the central server 106 includes means such as the first processor 202, the first memory device 204, the first communication interface 206, the first workflow management unit 208, and/or the like for modifying the task, in response to determining that the second voice input is indicative of the exception encountered during execution of the task.

Figure 17:
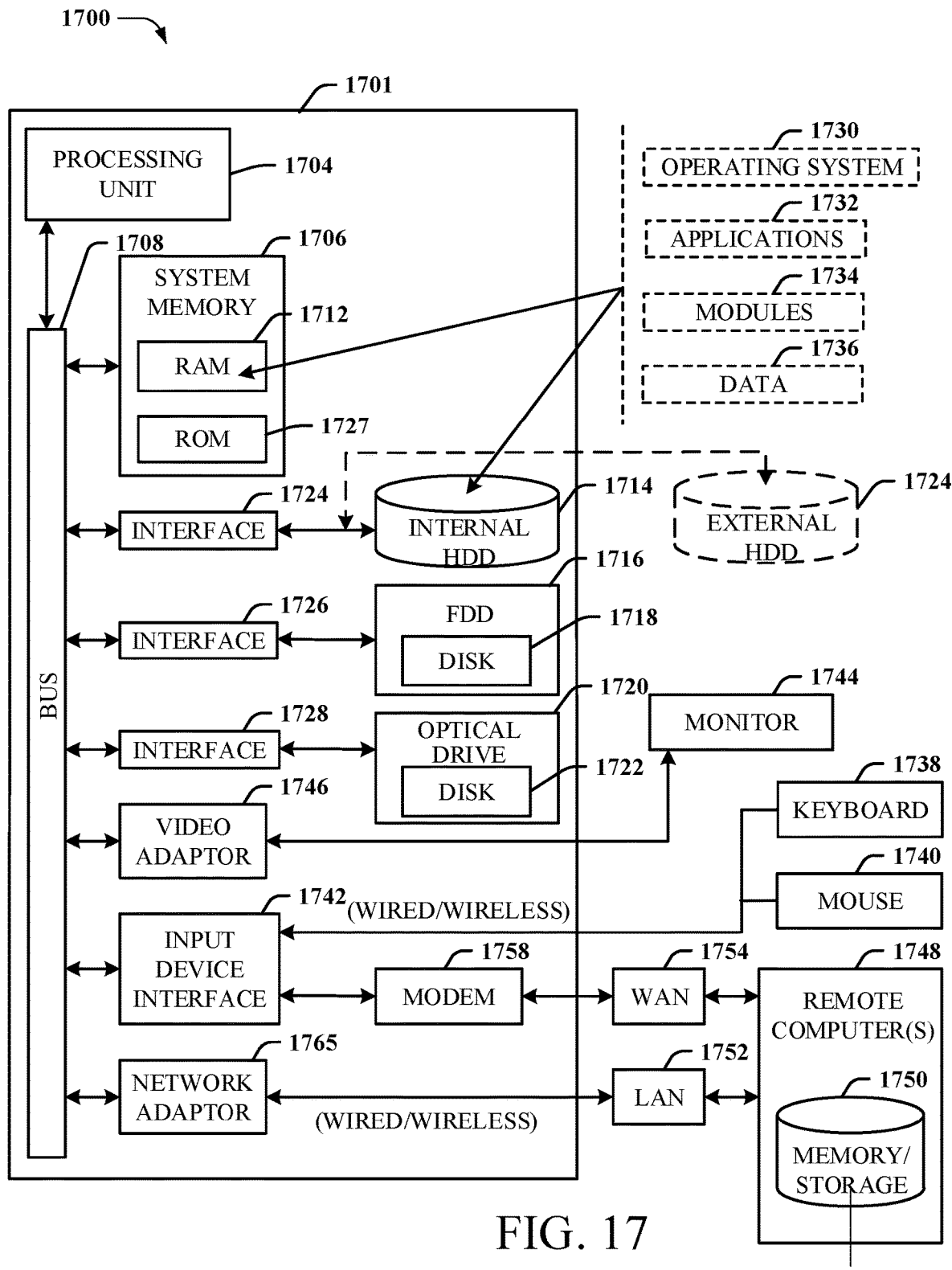
FIG. 17 illustrates a block diagram of a computer, according to one or more embodiments described herein.

Referring now to FIG. 17, there is illustrated a block diagram of a computer 1700 operable to execute the functions and operations performed in the described example embodiments. The computer 1700 can provide networking and communication capabilities between a wired or wireless communication network and a server and/or communication device. In order to provide additional context for various aspects thereof, FIG. 17 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 17, implementing various aspects described herein with regards to the end-user device can include a computer 1700, the computer 1700 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes read-only memory (ROM) 1727 and random access memory (RAM) 1712. A basic input/output system (BIOS) is stored in a non-volatile memory 1727 such as ROM, EPROM, EEPROM, which BIOS contains the basic routines that help to transfer information between elements within the computer 1700, such as during start-up. The RAM 1712 can also include a high-speed RAM such as static RAM for caching data.

The computer 1700 further includes an internal hard disk drive (HDD) 1714 (e.g., EIDE, SATA), which internal hard disk drive 1714 can also be configured for external use in a suitable chassis (not shown), a magnetic floppy disk drive (FDD) 1716, (e.g., to read from or write to a removable diskette 1718) and an optical disk drive 1720, (e.g., reading a CD-ROM disk 1722 or, to read from or write to other high capacity optical media such as the DVD). The hard disk drive 1714, magnetic disk drive 1716 and optical disk drive 1720 can be connected to the system bus 1708 by a hard disk drive interface 1724, a magnetic disk drive interface 1726 and an optical drive interface 1728, respectively. The interface 1724 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1700 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1700, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. It is to be appreciated that the various embodiments can be implemented with various commercially available operating systems or combinations of operating systems.

A user can enter commands and information into the computer 1700 through one or more wired/wireless input devices, e.g., a keyboard 1738 and a pointing device, such as a mouse 1740. Other input devices (not shown) may include a microphone, an IR remote control, a joystick, a game pad, a stylus pen, touch screen, or the like. These and other input devices are often connected to the processing unit 1704 through an input device interface 1742 that is coupled to the system bus 1708, but can be connected by other interfaces, such as a parallel port, an IEEE 1394 serial port, a game port, a USB port, an IR interface, etc.

A monitor 1744 or other type of display device is also connected to the system bus 1708 through an interface, such as a video adapter 1746. In addition to the monitor 1744, a computer 1700 typically includes other peripheral output devices (not shown), such as speakers, printers, etc.

The computer 1700 can operate in a networked environment using logical connections by wired and/or wireless communications to one or more remote computers, such as a remote computer(s) 1748. The remote computer(s) 1748 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1750 is illustrated. The logical connections depicted include wired/wireless connectivity to a local area network (LAN) 1752 and/or larger networks, e.g., a wide area network (WAN) 1754. Such LAN and WAN networking environments are commonplace in offices and companies, and facilitate enterprise-wide computer networks, such as intranets, all of which may connect to a global communications network, e.g., the Internet.

When used in a LAN networking environment, the computer 1700 is connected to the local network 1752 through a wired and/or wireless communication network interface or adapter 1765. The adapter 1765 may facilitate wired or wireless communication to the LAN 1752, which may also include a wireless access point disposed thereon for communicating with the wireless adapter 1765.

When used in a WAN networking environment, the computer 1700 can include a modem 1758, or is connected to a communications server on the WAN 1754, or has other means for establishing communications over the WAN 1754, such as by way of the Internet. The modem 1758, which can be internal or external and a wired or wireless device, is connected to the system bus 1708 through the input device interface 1742. In a networked environment, program modules depicted relative to the computer, or portions thereof, can be stored in the remote memory/storage device 1750. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "1000BaseT" wired Ethernet networks used in many offices.

The embodiments disclosed herein encompass numerous advantages. For example, since the exception encountered during execution of the task is reported through voice inputs, the first worker 110 does not have go through complex menus of the one or more light devices 104. Therefore, overall productivity of the system is better in comparison to the convention techniques.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor 402 may be any processor, controller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor readable media. These instructions may be embodied by one or more processor executable software modules that reside on the one or more non-transitory computer-readable or processor-readable storage media. Non-transitory computer-readable or processor 402-readable storage media may in this regard comprise any storage media that may be accessed by a computer or a processor. By way of example but not limitation, such non-transitory computer-readable or processor readable media may include RAM, ROM, EEPROM, FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor readable media. Additionally, any combination of instructions stored on the one or more non-transitory processor readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A method, comprising:
   receiving, by a computing device comprising a processor, an input from an operator device, wherein the input facilitates determining a task to be performed;
   controlling, by the computing device, orientation of a light device with respect to a first location in a workplace in response to receiving the input, wherein the first location is associated with the task to be performed;
   receiving, by the computing device, a first voice input from the operator device, indicative of an exception encountered during execution of the task;
   controlling, by the computing device, a display screen of the first light device to display a query in response to the first voice input from the operator device, wherein the query is associated with the exception encountered during the execution of the task;
   receiving, by the computing device, a second voice input from the operator device in response to the displayed query; and
   modifying the task to determine a new task based on each of:
   a determination that the first voice input is indicative of the exception encountered during execution of the task, and
   the second voice input;
   wherein the new task corresponds to handling the exception encountered during execution of the task.

2. The method of claim 1, wherein the determining the new task comprises:
   modifying, by the computing device, the orientation of the light device with respect to a second location in the workplace where the task is to be completed.

3. The method of claim 1, wherein the operator device comprises a barcode scanner and a voice input device.

4. The method of claim 1, further comprising: causing, by the computing device, the light device to display a first quantity of an item to be picked from the first location, wherein the task involves picking the first quantity of the item.

5. The method of claim 4, wherein the first voice input is indicative of at least a second quantity of the item picked during executing of the task.

6. The method of claim 5, further comprising:
   determining, by the computing device, whether the first quantity of the item is equal to the second quantity of the item, and
   in response to the determining that the first quantity of the item is equal to the second quantity of the item, determining, by the computing device, a status of the task as complete.

7. The method of claim 5, further comprising:
determining, by the computing device, whether the first quantity of the item is different from the second quantity of the item, and
in response to the determining that the first quantity of the item is different from the second quantity of the item, determining, by the computing device, that the first voice input indicates the exception during execution of the task.

8. The method of claim 1, further comprising:
determining the first location of the task based on metadata associated with the task.

9. The method of claim 8, wherein the metadata includes at least one of a quantity of items to be picked and a location where the task is to be performed.

10. The method of claim 9, wherein the orientation of the light device is controlled based on the metadata associated with the task to be performed.

11. A system,
comprising: an operator device;
a light device in a workplace;
a computing device communicatively coupled to the operator device and the light device, wherein the computing device comprises a processor configured to:
receive an input from the operator device, wherein the input facilitates determining a task to be performed;
control orientation of the light device with respect to a first location in a workplace in response to receiving the input, wherein the first location is associated with the task to be performed;
receive a first voice input from the operator device, indicative of an exception encountered during execution of the task;
control a display screen of the first light device to display a query in response to the first voice input from the operator device, wherein the query is associated with the exception encountered during the execution of the task;
receive a second voice input from the operator device in response to the display of the query; and
modify the task to determine a new task based on each of:
a determination that the first voice input is indicative of the exception encountered during execution of the task, and
the second voice input;
wherein the new task corresponds to handling the exception during execution of the task.

12. The system of claim 11, wherein to modify the task, the processor is further configured to:
determination of a new task different from the task.

13. The system of claim 12, wherein to determine the new task, the processor is further configured to:
modify, by the computing device, the orientation of the light device with respect to a second location in the workplace where the task is to be completed.

14. The system of claim 13, wherein the processor is further configured to:
determine the first location of the task based on metadata associated with the task.

15. The system of claim 13, wherein the metadata includes at least one of a quantity of items to be picked and a location where the task is to be performed.

16. The system of claim 11, wherein the orientation of the light device is controlled based on the metadata associated with the task to be performed.

17. A computing device, comprising:
a memory device configured to store a set of instructions;
a processor communicatively coupled to the memory device, the processor is configured to execute the set of instructions to:
receive an input from the operator device, wherein the input facilitates determining a task to be performed;
control orientation of a light device with respect to a first location in a workplace in response to receiving the input, wherein the first location is associated with the task to be performed;
receive a first voice input from the operator device, indicative of an exception encountered during execution of the task;
control a display screen of the first light device to display a query in response to the first voice input from the operator device, wherein the query is associated with the exception encountered during the execution of the task;
receive a second voice input from the operator device in response to the display of the query; and
modify the task to determine a new task based on each of:
a determination that the first voice input is indicative of the exception encountered during execution of the task; and
the second voice input;
wherein the new task corresponds to handling the exception during execution of the task.

18. The computing device of claim 17, wherein the processor is further configured to:
determine the first location of the task based on metadata associated with the task, wherein the metadata includes at least one of a quantity of items to be picked and a location where the task is to be performed.

* * * * *